United States Patent
Islam et al.

(10) Patent No.: US 11,057,937 B2
(45) Date of Patent: Jul. 6, 2021

(54) RELAY NODE CONNECTION TECHNIQUES IN WIRELESS BACKHAUL SYSTEMS

(71) Applicant: QUALCOMM Incorporated, San Diego, CA (US)

(72) Inventors: Muhammad Nazmul Islam, Edison, NJ (US); Navid Abedini, Somerset, NJ (US); Jianghong Luo, Skillman, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/153,088

(22) Filed: Oct. 5, 2018

(65) Prior Publication Data

US 2019/0124696 A1    Apr. 25, 2019

Related U.S. Application Data

(60) Provisional application No. 62/574,471, filed on Oct. 19, 2017.

(51) Int. Cl.
*H04W 74/08* (2009.01)
*H04W 76/10* (2018.01)
(Continued)

(52) U.S. Cl.
CPC ........ *H04W 74/0833* (2013.01); *H04B 7/269* (2013.01); *H04W 48/00* (2013.01);
(Continued)

(58) Field of Classification Search
CPC ........... H04W 74/0833; H04W 56/001; H04W 76/10
See application file for complete search history.

(56) References Cited

U.S. PATENT DOCUMENTS 5,706,284 A * 1/1998 Lee ..................... H04B 1/7156
                                                    370/324
7,756,476 B2 * 7/2010 Suzuki .............. H04L 29/12292
                                                    455/41.2
(Continued)

FOREIGN PATENT DOCUMENTS

WO    WO-2010142852 A1    12/2010
WO    WO-2015165483 A1    11/2015

OTHER PUBLICATIONS

AT&T: "NR Initial Access Procedure Design", 3GPP DRAFT; 3GPP TSG RAN1 Meeting #87, R1-1612361 NR-Initial Access,3rd Generation Partnership Project (3GPP), Mobile Competence Centre, 650, Route Des Lucioles, F-06921, Sophia-Anti Polis Cedex, France, vol. RAN WG1, No. Reno, USA; Nov. 14, 2016-Nov. 18, 2016 Nov. 13, 2016, XP051176309, Retrieved from the Internet: URL:http://www.3gpp.org/ftp/Meetings_3GPP_SYNC/RAN1/Docs/ [retrieved on Nov. 13, 2016], 6 pages.

(Continued)

*Primary Examiner* — Rasheed Gidado
(74) *Attorney, Agent, or Firm* — Linda G. Gunderson

(57) ABSTRACT

Methods, systems, and devices for wireless communications are described that support node connection techniques in wireless systems, such as relay node connections in a wireless backhaul network. A first node, which may be a new node or a node seeking to re-establish a connection, may initiate a connection establishment through transmission of a synchronization signal (SS). The first node, responsive to the SS transmission, may receive a response signal from one of the other nodes, and may establish a link with the other node. In some cases, the response signal may be an SS transmission from the other node, and the first node may transmit a random access request to the other node to initiate establishment of the link. In other cases, the response signal (Continued)

may be a random access request from the other node to initiate establishment of the link.

26 Claims, 14 Drawing Sheets

(51) Int. Cl.
    *H04W 56/00*     (2009.01)
    *H04W 92/20*     (2009.01)
    *H04B 7/26*     (2006.01)
    *H04W 48/00*     (2009.01)

(52) U.S. Cl.
    CPC ......... *H04W 56/001* (2013.01); *H04W 76/10* (2018.02); *H04W 92/20* (2013.01); *H04W 56/0015* (2013.01)

(56) References Cited

U.S. PATENT DOCUMENTS

| | | | | |
|---|---|---|---|---|
| 8,391,792 | B2* | 3/2013 | Glezerman | H04W 84/18 455/41.2 |
| 8,630,205 | B2* | 1/2014 | Chou | H04W 24/00 370/254 |
| 9,066,365 | B2* | 6/2015 | Kim | H04W 72/1231 |
| 9,363,773 | B1* | 6/2016 | Yuan | H04W 52/00 |
| 9,985,714 | B1* | 5/2018 | Hou | H04B 7/0617 |
| 2006/0041678 | A1* | 2/2006 | Morris | H04L 29/06027 709/236 |
| 2006/0245360 | A1* | 11/2006 | Ensor | H04W 8/26 370/238 |
| 2008/0025279 | A1* | 1/2008 | Young | H04W 52/0216 370/341 |
| 2009/0161599 | A1* | 6/2009 | Haartsen | H04W 56/00 370/326 |
| 2009/0225694 | A1* | 9/2009 | Kim | H04B 7/2606 370/315 |
| 2010/0111069 | A1* | 5/2010 | Torsner | H04L 1/1635 370/350 |
| 2013/0094536 | A1* | 4/2013 | Hui | H04B 1/713 375/133 |
| 2013/0294230 | A1* | 11/2013 | Popa | H04L 47/743 370/230 |
| 2014/0146727 | A1* | 5/2014 | Segev | H04W 48/08 370/311 |
| 2015/0373618 | A1* | 12/2015 | Deenoo | H04W 8/005 455/502 |
| 2017/0223690 | A1* | 8/2017 | Zeng | H04W 16/28 |
| 2017/0231011 | A1* | 8/2017 | Park | H04W 72/0446 |
| 2019/0268817 | A1* | 8/2019 | Seo | H04W 36/08 |

OTHER PUBLICATIONS

International Search Report and Written Opinion—PCT/US2018/054838—ISAEPO—dated Jul. 1, 2019.
ZTE: "Synchronization in Backhaul Link", 3GPPTSG-RAN WG1 #59b, R1-100544, 3rd Generation Partnership Project (3GPP), Mobile Competence Centre; 650, Route Des Lucioles; F-06921 Sophia-Anti Polls Cedex; France, vol. RAN WG1, No. Valencia, Spain; Valencia, Spain, Jan. 18-22, 2010,Jan. 12, 2010, XP050418172, 4 pages, [retrieved on Jan. 12, 2010].

* cited by examiner

RELAY NODE CONNECTION TECHNIQUES IN WIRELESS BACKHAUL SYSTEMS

CROSS REFERENCES

The present Application for Patent claims benefit of U.S. Provisional Patent Application No. 62/574,471 by Islam et al., entitled "Relay Node Connection Techniques in Wireless Backhaul Systems," filed Oct. 19, 2017, assigned to the assignee hereof, and expressly incorporated by reference in its entirety.

BACKGROUND

The following relates generally to wireless communication, and more specifically to relay node connection techniques in wireless backhaul systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long-Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may include access nodes to facilitate wireless communication between UEs and a network. For example, an LTE base station may provide a mobile device access to the internet via the LTE wireless network. Access nodes typically have a high-capacity, wired, backhaul connection (e.g., fiber) to the network. In some deployments, however, it may be desirable to deploy a larger number of access nodes in a small area to provide enhanced coverage to users. In such deployments, it may be impracticable to connect each access node to the network via a wired connection. In some systems, such as systems with relatively densely spaced base stations, base stations may use wireless backhaul links through one or more relay nodes for backhaul communications in addition to or instead of wireline links. Efficient deployment and connection establishment for relay nodes and base stations with wireless backhaul connections may thus be desirable.

SUMMARY

The described techniques relate to improved methods, systems, devices, or apparatuses that support node connection techniques in wireless systems. Generally, the described techniques provide for a first node, which may be a new node or a node seeking to re-establish a wireless connection, to initiate a connection establishment through transmission of a synchronization signal (SS) (or reference signal) from the first node to one or more other nodes that are established in a network. In some cases, one or more of the nodes may be a relay node and the network may be a wireless backhaul network. The first node, responsive to the SS transmission, may receive a response signal from one of the other nodes, and may establish a link with the other node. In some cases, the response signal may be an SS transmission from the other node, and the first node may transmit a random access request to the other node to initiate establishment of the wireless link. In other cases, the response signal may be a random access request from the other node to initiate establishment of the wireless link.

A method of wireless communication is described. The method may include transmitting, from a first node seeking to join a network, a first SS, where the network provides access to a core network of a wireless communication system, and where the first node is seeking to establish a wireless link between the first node and one or more other nodes of the network, receiving, at the first node, a response signal from a second node that is established in the network, and establishing the wireless link with the second node based at least in part on the response signal from the second node.

An apparatus for wireless communication is described. The apparatus may include means for transmitting, from a first node seeking to join a network, a first SS, where the network provides access to a core network of a wireless communication system, and where the first node is seeking to establish a wireless link between the first node and one or more other nodes of the network, means for receiving, at the first node, a response signal from a second node that is established in the network, and means for establishing the wireless link with the second node based at least in part on the response signal from the second node.

Another apparatus for wireless communication is described. The apparatus may include a processor, memory in electronic communication with the processor, and instructions stored in the memory. The instructions may be operable to cause the processor to transmit, from a first node seeking to join a network, a first SS, where the network provides access to a core network of a wireless communication system, and where the first node is seeking to establish a wireless link between the first node and one or more other nodes of the network, receive, at the first node, a response signal from a second node that is established in the network, and establish the wireless link with the second node based at least in part on the response signal from the second node.

A non-transitory computer-readable medium for wireless communication is described. The non-transitory computer-readable medium may include instructions operable to cause a processor to transmit, from a first node seeking to join a network, a first SS, where the network provides access to a core network of a wireless communication system, and where the first node is seeking to establish a wireless link between the first node and one or more other nodes of the network, receive, at the first node, a response signal from a second node that is established in the network, and establish the wireless link with the second node based at least in part on the response signal from the second node.

In some examples of the method, apparatus, and non-transitory computer-readable medium described herein, at least one of the first node or the second node may be a relay node of a backhaul network. In some examples of the method, apparatus, and non-transitory computer-readable medium described herein, the first node transmits the first SS prior to detecting one or more transmissions of the second node. In some examples of the method, apparatus, and non-transitory computer-readable medium described herein, the first node is a relay node and the network is a backhaul network, the second node is a relay node that is established in the backhaul network, and the first node transmits the first SS prior to detecting one or more transmissions of the second node or another node of the backhaul network. In some examples of the method, apparatus, and non-transitory computer-readable medium described herein, the receiving the response signal includes receiving a second SS from the second node.

In some examples of the method, apparatus, and non-transitory computer-readable medium described herein, the receiving the response signal further includes identifying an access configuration of the second node based at least in part on information contained in the second SS. In some examples of the method, apparatus, and non-transitory computer-readable medium described herein, the establishing the wireless link with the second node includes transmitting a random access request message to the second node based at least in part on the second SS from the second node.

In some examples of the method, apparatus, and non-transitory computer-readable medium described herein, the receiving the response signal includes receiving a random access request from the second node in response to the first SS that requests the first node join the network. In some examples of the method, apparatus, and non-transitory computer-readable medium described herein, the establishing the wireless link includes transmitting a random access response to the second node, and establishing the wireless link based at least in part on the random access response.

In some examples of the method, apparatus, and non-transitory computer-readable medium described herein, the receiving the response signal includes receiving a second SS from the second node, the second SS transmitted using a beam directed toward the first node and including access configuration information of the second node. In some examples of the method, apparatus, and non-transitory computer-readable medium described herein, the access configuration information of the second node includes one or more of a random access preamble for a random access request, a number of antenna ports for the random access request, random access resources for transmitting the random access request, power control information for transmitting the random access request, or any combination thereof. In some examples of the method, apparatus, and non-transitory computer-readable medium described herein, the receiving the response signal includes receiving a second SS from the second node, the second SS including access configuration information of a third node.

In some examples of the method, apparatus, and non-transitory computer-readable medium described herein, the first SS includes information for generating a random access request at the second node. In some examples of the method, apparatus, and non-transitory computer-readable medium described herein, the response signal may be a random access request from the second node, and where the second node transmits one or more commands to align a time reference and frequency reference of the first node to corresponding references of the second node. In some examples of the method, apparatus, and non-transitory computer-readable medium described herein, the one or more commands may be transmitted in a random access procedure, in radio resource control signaling, or combinations thereof.

In some examples of the method, apparatus, and non-transitory computer-readable medium described herein, the receiving the response signal includes receiving a random access request from the second node having a random access preamble, or using a random access resource, that indicates a request that the first node join the network. In some examples of the method, apparatus, and non-transitory computer-readable medium described herein, the receiving the response signal further includes receiving two or more random access messages that include information for establishing the wireless link.

Some examples of the method, apparatus, and non-transitory computer-readable medium described herein may further include processes, features, means, or instructions for establishing, prior to the transmitting, an initial wireless link with the second node. Some examples of the method, apparatus, and non-transitory computer-readable medium described herein may further include processes, features, means, or instructions for determining that a loss of connection may have occurred for the initial wireless link, and the transmitting and the receiving may be performed responsive to the determining that the loss of connection may have occurred.

A method of wireless communication is described. The method may include receiving, at a second node, a first SS from a first node, where the second node is established in a network that provides access to a core network of a wireless communication system, and where the first node is seeking to join the network, transmitting a response signal to the first node, the response signal based at least in part on the first SS, and establishing a wireless link with the first node based at least in part on the response signal and the first SS.

An apparatus for wireless communication is described. The apparatus may include means for receiving, at a second node, a first SS from a first node, where the second node is established in a network that provides access to a core network of a wireless communication system, and where the first node is seeking to join the network, means for transmitting a response signal to the first node, the response signal based at least in part on the first SS, and means for establishing a wireless link with the first node based at least in part on the response signal and the first SS.

Another apparatus for wireless communication is described. The apparatus may include a processor, memory in electronic communication with the processor, and instructions stored in the memory. The instructions may be operable to cause the processor to receive, at a second node, a first SS from a first node, where the second node is established in a network that provides access to a core network of a wireless communication system, and where the first node is seeking to join the network, transmit a response signal to the first node, the response signal based at least in part on the first SS, and establish a wireless link with the first node based at least in part on the response signal and the first SS.

A non-transitory computer-readable medium for wireless communication is described. The non-transitory computer-readable medium may include instructions operable to cause a processor to receive, at a second node, a first SS from a first node, where the second node is established in a network that provides access to a core network of a wireless communication system, and where the first node is seeking to join the network, transmit a response signal to the first node, the response signal based at least in part on the first SS, and establish a wireless link with the first node based at least in part on the response signal and the first SS.

In some examples of the method, apparatus, and non-transitory computer-readable medium described herein, at least one of the first node or the second node may be a relay node of a backhaul network. In some examples of the method, apparatus, and non-transitory computer-readable medium described herein, the transmitting the response signal includes transmitting a second SS to the first node that indicates an access configuration of the second node, or transmitting a random access request message to the first node based at least in part on the first SS, that requests the first node join the network. Some examples of the method, apparatus, and non-transitory computer-readable medium described herein may further include processes, features, means, or instructions for determining, prior to transmitting the response signal, whether to transmit the second SS or the random access request message based at least in part on one or more of a schedule of transmissions, a capability of the first node, a power mode of the second node, an indication from one or more other nodes of the network, or any combination thereof.

In some examples of the method, apparatus, and non-transitory computer-readable medium described herein, the transmitting the response signal includes transmitting, from the second node, a second SS using a beam directed toward the first node and including access configuration information of the second node. In some examples of the method, apparatus, and non-transitory computer-readable medium described herein, the access configuration information of the second node includes one or more of a random access preamble for a random access request, a number of antenna ports for the random access request, random access resources for transmitting the random access request, power control information for transmitting the random access request, or any combination thereof.

Some examples of the method, apparatus, and non-transitory computer-readable medium described herein may further include processes, features, means, or instructions for transmitting an indication of the first SS to one or more other nodes of the network. In some examples of the method, apparatus, and non-transitory computer-readable medium described herein, the transmitting the response signal includes transmitting, from the second node, a second SS that indicates access configuration information of a third node. In some examples of the method, apparatus, and non-transitory computer-readable medium described herein, the first SS includes information for generating a random access request at the second node.

In some examples of the method, apparatus, and non-transitory computer-readable medium described herein, the response signal may be a random access request from the second node, and where the second node transmits one or more commands to align a time reference and frequency reference of the first node to corresponding references of the second node. In some examples of the method, apparatus, and non-transitory computer-readable medium described herein, a power of the random access request may be based at least in part on a measured power of the first SS.

In some examples of the method, apparatus, and non-transitory computer-readable medium described herein, the transmitting the response signal includes transmitting a random access request from the second node having a random access preamble, or using a random access resource, that indicates a request that the first node join the network. In some examples of the method, apparatus, and non-transitory computer-readable medium described herein, the transmitting the response signal further includes transmitting two or more random access messages that include information for establishing the wireless link.

A method of wireless communication is described. The method may include transmitting, from a first node seeking to join a network, a first SS, wherein the first node is seeking to establish a wireless link between the first node and one or more other nodes of the network, receiving, at the first node, a second SS from a second node that is established in the network, and establishing the wireless link with the second node based at least in part on the first SS and the second SS.

An apparatus for wireless communication is described. The apparatus may include means for transmitting, from a first node seeking to join a network, a first SS, wherein the first node is seeking to establish a wireless link between the first node and one or more other nodes of the network, receiving, at the first node, a second SS from a second node that is established in the network, and establishing the wireless link with the second node based at least in part on the first SS and the second SS.

Another apparatus for wireless communication is described. The apparatus may include a processor, memory in electronic communication with the processor, and instructions stored in the memory. The instructions may be operable to cause the processor to transmit, from a first node seeking to join a network, a first SS, wherein the first node is seeking to establish a wireless link between the first node and one or more other nodes of the network, receive, at the first node, a second SS from a second node that is established in the network, and establish the wireless link with the second node based at least in part on the first SS and the second SS.

A non-transitory computer-readable medium for wireless communication is described. The non-transitory computer-readable medium may include instructions operable to cause a processor to transmit, from a first node seeking to join a network, a first SS, wherein the first node is seeking to establish a wireless link between the first node and one or more other nodes of the network, receive, at the first node, a second SS from a second node that is established in the network, and establish the wireless link with the second node based at least in part on the first SS and the second SS.

DETAILED DESCRIPTION

Figure 1:
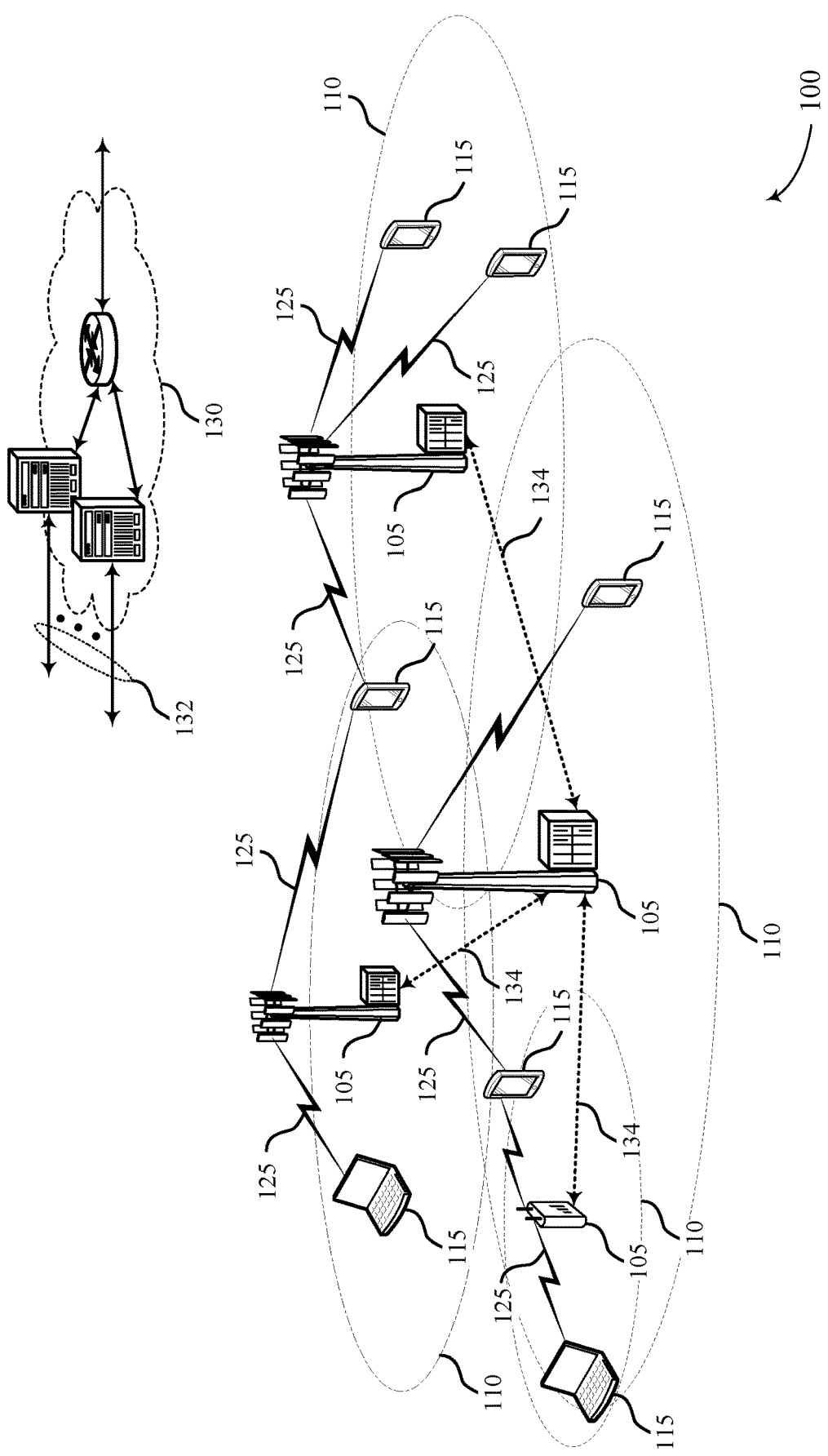
FIG. 1 illustrates an example of a system for wireless communication in accordance with aspects of the present disclosure.

Wireless communications systems may use various techniques for communications, and in some systems, such as fifth generation (5G) or New Radio (NR) systems, directional communications (e.g., millimeter wave (mmW) transmissions) may be established between wireless nodes (e.g., a base station or a user equipment (UE)). Directional transmissions may be used to support, for example, access traffic between an access node and a UE, or backhaul traffic between access nodes. Some systems, such as relatively dense deployments of mmW base stations, may provide only a subset of the access nodes with a wireline connection, and other access nodes may have a wireless backhaul connection with one or more of the subset of the access nodes with the wireline connection, which may be referred to as self-backhauling or integrated access/backhaul (IAB). Self-backhauling or IAB may share wireless resources between access traffic and backhaul traffic, and may have benefits of enhancing wireless link capacity, reducing latency, reducing the cost of cell deployment, or any combination thereof. In systems with mmW base station deployments, IAB may use relatively narrow beams, which may be referred to as pencil beams, for wireless backhaul links between base stations which can help reduce inter-link interference with one or more other directional communications links in the system.

Thus, in some aspects of the disclosure, wireless backhaul links may be used to couple an access node (AN) to a network in place of high-capacity, wired backhaul links (e.g., fiber). An AN may be a base station in a wireless communications system, for example, although other network devices may serve as an AN (e.g., a user equipment (UE) in a peer-to-peer or device-to-device communication system may serve as an AN). In some systems, a first AN may establish a wireless backhaul link to a relay node, which may have a wireless backhaul link to a second AN that has a high-capacity wired backhaul link. In this manner, the first AN may communicate access traffic to the network via the relay node and second AN. In some examples, a backhaul network may use multiple wireless backhaul links among multiple relay nodes before reaching a wired backhaul link. The backhaul network may also provide robustness via topological redundancy. In some cases, an AN may provide access to one or more UEs and may also act as a relay node by providing a wireless backhaul link to another AN. In the present disclosure, the term "relay node" is used generically to refer to any node that uses a wireless backhaul link in a backhaul network.

Various wireless communications systems as described herein may provide efficient techniques for relay nodes to access a backhaul network and establish a wireless backhaul link within the network. In some cases, a first relay node, which may be a new relay node or a relay node seeking to re-establish a backhaul connection, may seek to initiate a connection establishment in the backhaul network. In some cases, the first relay node may monitor for a synchronization signal (SS) that may be transmitted by other relay nodes in the network. Upon detection of the SS, the first relay node may transmit a random access request and a connection establishment procedure may be initiated based on the random access request. In some cases, however, one or more relay nodes in the backhaul network may not be transmitting SSs or may perform SS transmissions relatively infrequently. For example, if a relay node is in a power saving mode, the relay node may transmit an SS either relatively infrequently or not at all. In such cases, the first relay node may transmit an SS in order to initiate the connection establishment.

In some cases, an existing relay node may identify that the first relay node has transmitted an SS, and may transmit a response signal to the first relay node. The first relay node, responsive to the SS transmission, may receive a response signal from the existing relay node, and may establish a backhaul link with the other relay node. In some cases, the response signal may be an SS transmission from the existing relay node, and the first relay node may transmit a random access request to the existing relay node to initiate establishment of the backhaul link. In other cases, the response signal may be a random access request from the existing relay node to initiate establishment of the backhaul link.

While various techniques and examples discussed herein are directed to relay nodes establishing connections in a backhaul network, such techniques may be applied to any wireless network or nodes seeking to establish a connection with a network. For example, such techniques may be used by UEs and base stations in which a UE may seek to establish a connection with a base station, may transmit an SS or reference signal, and receive a random access request from the base station responsive thereto.

Aspects of the disclosure are initially described in the context of a wireless communications system and process flows for establishing a wireless backhaul link. Aspects of the disclosure are further illustrated by and described with reference to apparatus diagrams, system diagrams, and flowcharts that relate to relay node connection techniques in wireless backhaul systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices. One or more of the base stations 105 may serve as a relay node that provides a wireless backhaul link between one or more other base stations 105.

Base stations 105 may wirelessly communicate with UEs 115 or one or more other base stations 105 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). Backhaul links 134 may be wireline links or wireless links, as will be discussed in more detail below.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, a transmission/reception point (TRP), or a distributed unit (DU). In some configurations, various functions of each access network entity or base station 105 may be distributed across various network devices (e.g., radio heads and access network controllers or CUs and DUs) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. The propagation of EHF transmissions may be subject to even greater atmospheric attenuation and shorter range than SHF or UHF transmissions, which may lead to relatively dense deployments in systems that use mmW. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115 or another base station 105. For instance, some signals (e.g., SSs, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions.

A receiving device (e.g., a UE 115 or a base station 105, which may be an example of a mmW receiving device) may try multiple receive beams when receiving various signals, such as SSs, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

Wireless communications systems such as an NR system may utilize any combination of licensed, shared, and unlicensed spectrum bands, among others. In some cases, flexible symbol durations and subcarrier spacing may allow for the use of carriers across multiple spectrums. In some examples, NR shared spectrum may increase spectrum utilization and spectral efficiency, specifically through dynamic vertical (e.g., across frequency) and horizontal (e.g., across time) sharing of resources.

In various examples described herein, some base stations 105 may use wireless backhauling for a backhaul link 134 and in some cases may transmit different sets of control messages associated with access links and backhaul links through a relay node to a central unit (CU) and core network 130. As will be discussed in more detail below, one or more relay nodes may seek to establish wireless backhaul links in a backhaul network. Various techniques are disclosed for efficient establishment of wireless links within such a network.

Figure 2:
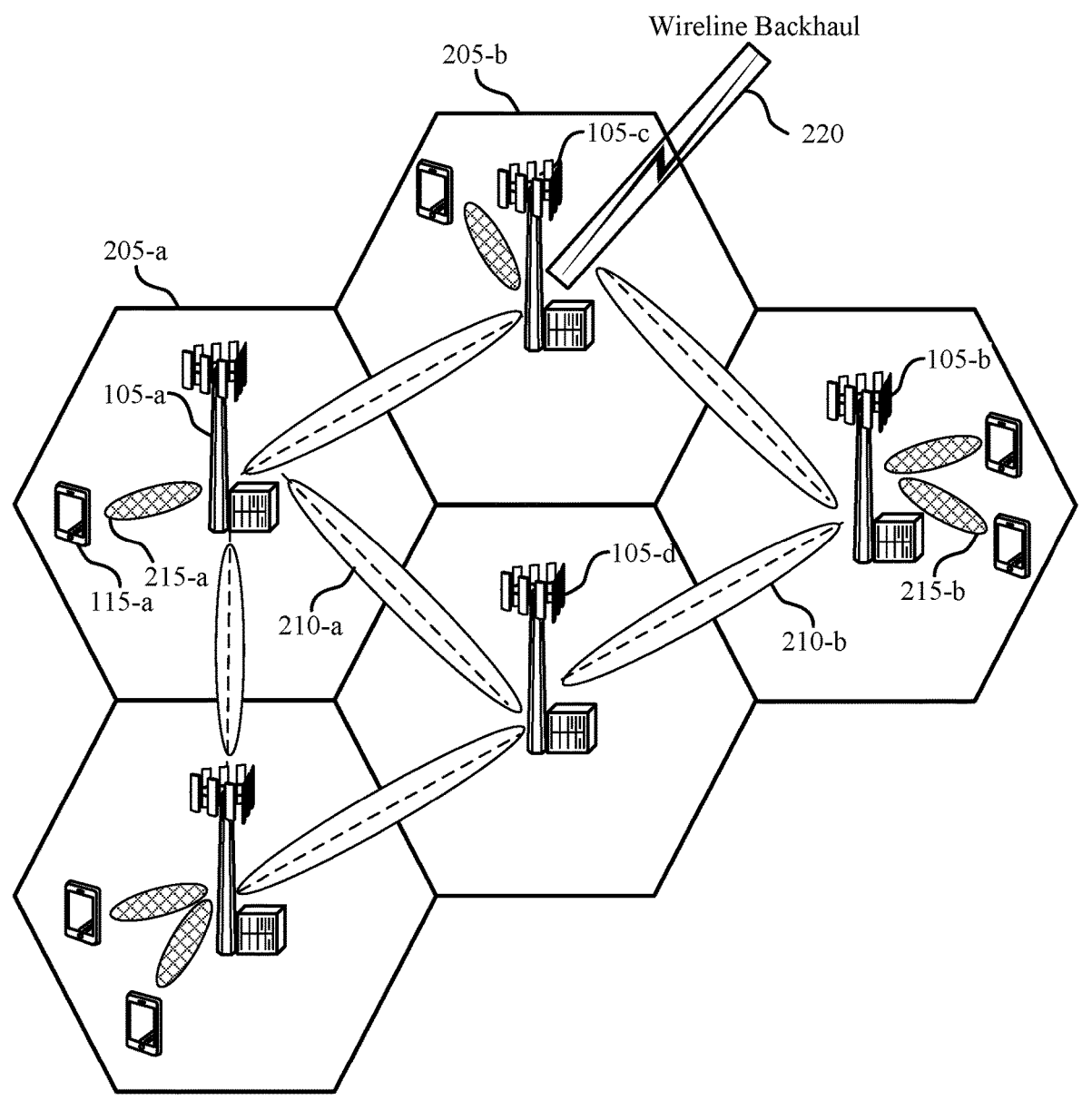
FIG. 2 illustrates an example of a wireless communication system in accordance with aspects of the present disclosure.

FIG. 2 illustrates an example of a wireless communications system 200 in accordance with various aspects of the present disclosure. In some examples, wireless communications system 200 may implement aspects of wireless communications system 100. Wireless communications system 200 may include a number of cells 205 that communicate with each other over wireless links 210 via base stations 105. That is, wireless communications system 200 may include wireline backhaul link 220, in addition to several relay nodes (e.g., base stations 105) such that cells 205 may be connected via wireless links 210. Wireless links 210 (e.g., wireless backhaul links, fronthaul links, access links, etc.) may be associated with a same or different set of wireless resources (e.g., time resources, frequency resources, code resources, spatial resources, etc.). Base stations 105 may further communicate with UEs 115 via direct wireless links 215 (e.g., access links). Wireless communications system 200 may support the coordination of direct communications links between different nodes (e.g., UEs 115, base stations 105, or any combination thereof) in the wireless communications system 200, and a node may configure such direct communications links.

In the example of FIG. 2, base stations 105 may be nodes, and one node, base station 105-c in this example, is supported with a wireline backhaul, such as a high capacity fiber backhaul connection to a core network. Other base stations 105 may be connected to base station 105-c with a backhaul wireless link 210. In some cases, the backhaul wireless links 210 or direct wireless links 215 may use pencil beams that use mmW directional transmissions. In some cases, base station 105-c may configure backhaul wireless links 210 between other base stations 105. For example, base station 105-c may configure the backhaul wireless link 210-a between base station 105-a and base station 105-d. In some cases, the base station 105-c, which may act as a relay node relative to the other base stations 105, may configure the backhaul wireless links 210 by initiating a communication link management procedure that may be used to establish a backhaul wireless link 210.

Figure 3:
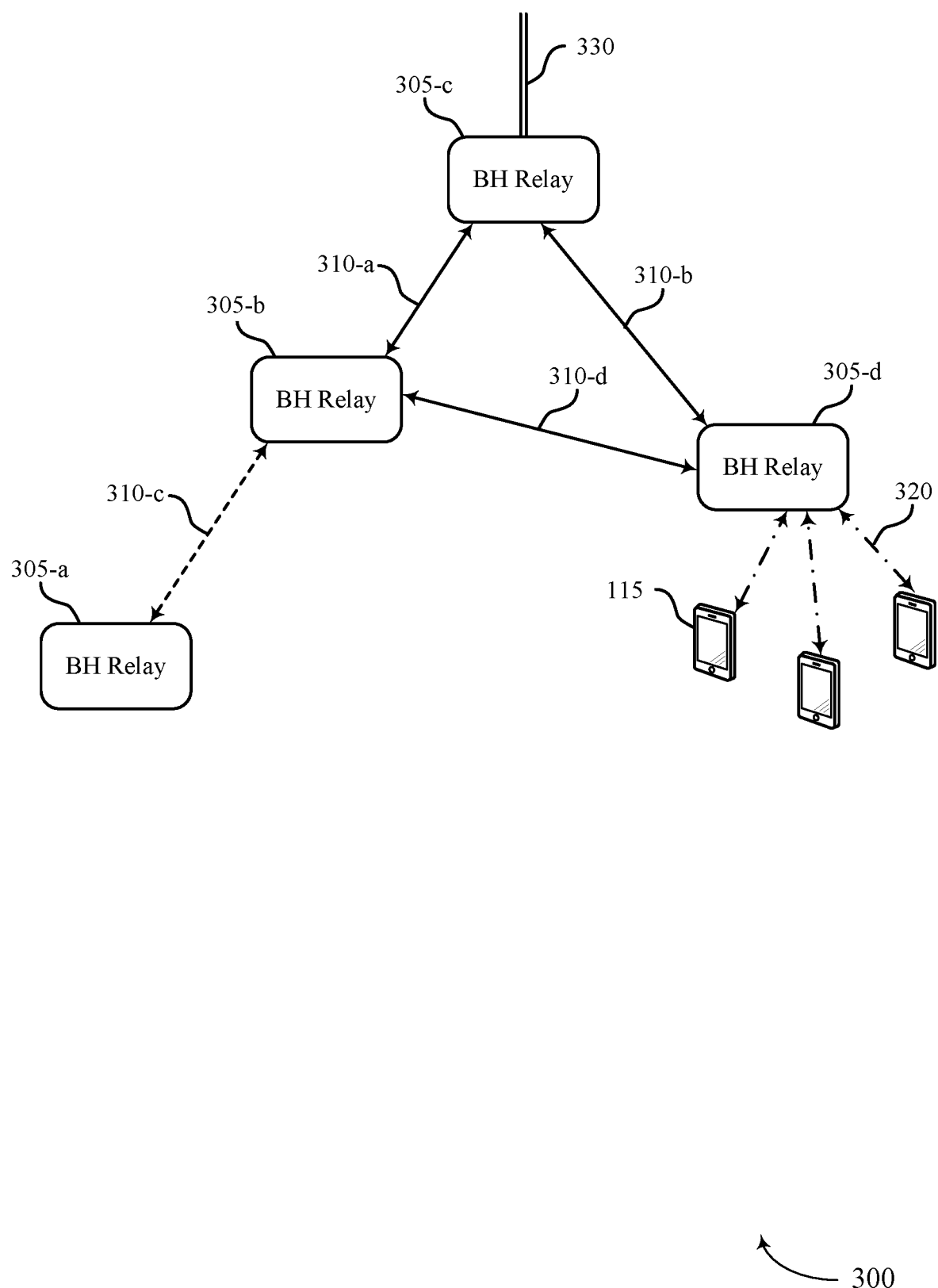
FIG. 3 illustrates an example of a relay node establishing a connection in a wireless backhaul network in accordance with aspects of the present disclosure.

Wireless backhauling and fronthauling between base stations 105 may be useful in deployments having relatively high densities of base stations, such as deployments that use mmW transmissions, because such techniques enable flexible and lower cost deployments of such relatively small cells. When referring to backhauling and fronthauling, reference is made to communications between base stations, between relay nodes and base stations, or between base stations and a core network, which may be made over backhaul links between a base station and a core network and over fronthaul links within a base station, between base stations, or between a relay node and a base station. The terms "backhauling" and "fronthauling" refer generally to such communications. Further, mmW transmissions are well suited for extended wireless backhaul/fronthaul networks due to their support of narrow antenna beams, which reduces inter-link interference. Accordingly, due to the limited range of mmW-based access, mmW cells are inherently small in nature, which may increase deployment cost if a wireline connection were provided to each base station 105. This, coupled with the ability for mmW transmissions to have relatively narrow pencil beams with low inter-link interference, may result in wireless backhauling and fronthauling being an attractive technique for such deployments. To establish a wireless backhaul link, a base station 105 may transmit a random access request to another base station 105, and a connection establishment for the wireless backhaul link may be initiated. In some cases, a base station 105 seeking to access the backhaul network may transmit an SS or a reference signal, and another base station 105 that is already established in the backhaul network may transmit a response signal to establish the wireless backhaul link. Wireless backhaul links may be provided by relay nodes and/or base stations, such as illustrated in FIG. 3. While various techniques and examples described herein are directed to relay nodes establishing connections in a backhaul network, such techniques may be applied to any wireless network or node(s) seeking to establish a connection with a network.

FIG. 3 illustrates an example of a relay node establishing a connection in a backhaul network 300 in accordance with aspects of the present disclosure. In some examples, backhaul network 300 may implement aspects of wireless communications systems 100 or 200. In some examples, backhaul network 300 may be an example of a wireless backhaul network. The backhaul network 300 may include a number of backhaul relay nodes 305 that communicate over a number of different communication links 310, which in some cases may be backhaul links within backhaul network 300. The relay nodes 305 may be examples of the base stations 105 described in reference to FIGS. 1 and 2.

In the example of FIG. 3, relay node 305-d may be a CU that is located at a central point of a star, and may be coupled with a wireline backhaul link 330 (i.e., an optical fiber cable). In some cases, relay node 305-d may be the only relay node 305 in backhaul network 300 that is coupled with the wireline backhaul link 330. Relay node 305-d may then communicate with relay node 305-b and relay node 305-a using communication link 310-a, and may communicate with relay node 305-d using communication link 310-b. As indicated above, in some cases, relay nodes 305 may also provide access to one or more UEs 115 through communication links 320. In some cases, second relay node 305-b and fourth relay node 305-d may have a backhaul link 310-d established therebetween, which may provide operational redundancy in the event that backhaul link 310-a backhaul link 310-b experience a failure.

In this example, a first relay node 305-a may seek initial access to backhaul network 300 in which a second relay node 305-b, a third relay node 305-c and a fourth relay node 305-d may already have established wireless backhaul links 310-a and 310-b. In some cases, the first relay node 305-a may have previously had an established backhaul link 310 in the backhaul network 300, and may be seeking to re-establish a connection after, for example, a beam failure. When seeking to establish backhaul link 310-c, the first relay node 305-a may attempt to monitor for one or more SSs transmitted by one or more other relay nodes 305. As indicated above, in some cases a relay node 305 may not be able to transmit an SS, or may only infrequently transmit an SS, such as if the relay node 305 is in a power saving mode. Thus, in some cases, the first relay node 305-a, when an SS is not detected for a certain period of time, may initiate a connection establishment by transmitting its own SS. In such cases, the first relay node 305-a may start transmitting SS, and also monitor for a response signal from other relay nodes 305 and for any SS from other relay nodes 305.

In some cases, the SS transmission may include a transmission of a series of SS blocks, which may include reference signal transmissions and system information that one or more of the other relay nodes 305 may use to transmit a random access request to the first relay or modify an SS transmission to enhance likelihood of detection at the first relay node 305-a. In some cases, the SS transmissions of the first relay node 305-a may be mmW transmissions, and may include SS block transmissions transmitted according to a beam sweeping pattern. The SS transmissions of the first relay node 305-a (as well as the SS transmissions of other relay nodes 305) may include, for example, system information such as a master information block (MIB), a system information block (SIB), minimum system information (minSI), remaining system information (RMSI), or any combination thereof. In some cases, the system information of the SS transmissions may include information to indicate that the first relay node 305-a is a new (e.g., additional) relay in the system (e.g., it may select a temporary cell ID from of a preconfigured set of cell IDs for new relays).

In some cases, one or more of the existing relays, such as the second relay node 305-b, may receive an indication that the first relay node 305-a is present. For example, the first relay node 305-a may operate according to a non-stand-alone (NSA) mode, in which an anchor carrier may be established, such as an LTE carrier or a NR carrier operating at a lower frequency than the backhaul network (e.g., the anchor carrier may be sub-6 GHz), and the backhaul network 300 operates according to a different radio access technology (RAT) (e.g., a 5G or NR backhaul link and an LTE anchor carrier), or at a higher frequency than the anchor carrier (e.g., a mmW backhaul link and a sub-6 GHz anchor carrier). In such a case, the first relay node 305-a may have an established anchor carrier connection, and the second relay node 305-b may receive an indication of the presence of the first relay node 305-a through the anchor carrier connection. In such cases, the first relay node 305-a may not need to transmit SS transmissions. In some cases, a different relay node, such as fourth relay node 305-d may detect one or more SS transmissions of the first relay node 305-a, and may notify the second relay node 305-b of the presence of the first relay node 305-a.

In some cases, the other existing relay nodes 305-b through 305-d of the backhaul network 300 may operate according to a power saving mode in which SS or reference signal transmissions may be transmitted relatively infrequently. In such cases, each relay node 305 of the group of relay nodes 305 may wake up within a configured time window to transmit/receive SS or reference signal transmissions, to maintain the synchronization among themselves and also detect new relay nodes, such as first relay node 305-a. In this case, the first relay node 305-a may transmit its SS or reference signal transmissions, or combinations thereof, frequently enough to be detected by the other relay nodes 305-b through 305-d. In one example, the wake-up time of the other relay nodes 305-b through 305-d are staggered in time to increase the chance of detecting new relays such as first relay node 305-a, and each relay node 305-b through 305-d may wake up within a configured wakeup time window to transmit and receive SS and/or reference signal transmissions. In other examples, combinations of the above two techniques may be used, in which relay nodes 305-b through 305-d may wake up within a time window to maintain their synchronization and connection, and additionally may wake up during staggered time periods to detect new or re-connecting relays, such as the first relay node 305-a.

In some cases, the second relay node 305-b may receive a notification that the first relay node 305-a is present. Such a notification may come from one or more other relay nodes 305 of the backhaul network 300, or based on a detection at the second relay node 305-b of an SS/reference signal transmitted by the first relay node 305-a. In some examples, the second relay node 305-b may modify its access configuration (e.g., SS/reference signal transmissions, resources for receiving random access requests, or combinations thereof) based on the notification of the first relay node 305-a. For example, the second relay node 305-a may modify a transmit/receive beam sweeping pattern and periodicity, waveforms, numerology, random access preamble, number of antenna ports, resources and configuration for transmitting system information (e.g., MIB, minSI, RMSI, etc.), power control for random access channel transmissions, or any combination thereof. In other examples, the second relay node 305-b may transmit a random access request to the first relay node 305-a and ask the first relay node 305-a to join the backhaul network 300. Thus, the response signal to the first relay node 305-a may be either an SS/reference signal transmission, or a random access request, transmitted to the first relay node 305-a. In some cases, whether to transmit an SS/reference signal transmission to the first relay node 305-a, or to transmit a random access request to the first relay node 305-a, may be determined by the second relay node 305-b, by a central entity (e.g., a core network), or collectively decided by the existing relay nodes 305-b through 305-d. In some cases, a determination of the type of response signal may be based at least in part on one or more of a schedule, a capability of one or more of the relay nodes 305, a state (e.g., active or power saving) of one or more relay nodes 305, or any combination thereof.

In cases where the second relay node 305-b may modify its access configuration based on identifying that the first relay node 305-a is present, the second relay node 305-b may, for example, increase a frequency at which the SS/reference signal is transmitted. For example, the second relay node 305-b may be in a power saving mode in which an SS is transmitted relatively infrequently, and upon identifying that the first relay node 305-a is present may start transmitting SS transmissions more frequently, and correspondingly monitor for random access transmissions more frequently.

In some examples where the second relay node 305-b may modify its access configuration based on identifying that the first relay node 305-a is present, the second relay node 305-b may select an access resource/configuration that is more suitable for the first relay node 305-a. For example, the second relay node 305-b may modify its beam sweeping pattern to transmit directional beams with SS blocks, and receive transmission beams, according to the direction of the first relay node 305-a (e.g., more frequently, using more resources, or combinations thereof).

In some cases, the second relay node 305-b may also notify a central entity (e.g., a network entity in the core network) that the first relay node 305-a is present, and the central entity may coordinate multiple relay nodes 305 (e.g., the second relay node 305-b, third relay node 305-d, fourth relay node 305-d, or combinations thereof) to start transmitting SS transmissions and monitoring for random access requests (or make other access configuration modifications) to assist with integrating the first relay node 350-a with the backhaul network 300. Additionally or alternatively, the second relay node 305-b may directly coordinate with one or more other neighboring relay nodes 305 (e.g., through exchanging backhaul messages) to implement access configuration modifications to assist with integrating the first relay node 350-a with the backhaul network 300. In some cases, the choice of the group of relay nodes 305, the modifications to the access configuration, or combinations thereof, may be determined based on one or more factors. For example, such a selection may be made based on a location of the second relay node 305-b such that one or more neighboring relay nodes 305 may be selected to assist; a configuration, state, and schedule of the second relay node 305-b (e.g., a neighboring relay node 350 may be selected to transmit SS/reference signal within a window that the second relay node 305-b is not transmitting SS/reference signal); a direction or location of the first relay node 305-a that is detected and reported by the second relay node 305-b; one or more beam and channel related measurements performed by the second relay node 305-b (that may be reported to a central entity or other relay nodes 305); acquired information about the state, schedule and configuration of the first relay node 305-a (e.g., conveyed in MIB/SIB/minSI/RMSI of the first relay node 305-a SS transmissions); one or more of a schedule, state, configuration, or capabilities of each of the neighboring relay nodes 305; or any combination thereof. In some examples, SS transmissions from the group of relay nodes 305 may be coordinated to occur within a certain time and frequency window. In other examples, SS transmissions from the group of relay nodes 305 may be coordinated to be staggered over time to increase the likelihood of detection by the first relay node 305-a.

In some cases, the second relay node 305-b, or group of relay nodes 305, may be notified of the first relay node 305-a by another RAT (e.g., a lower frequency RAT) and as a result may start transmitting SS transmissions, and monitoring for random access request, or otherwise may modify their access configuration to assist with integrating the first relay node 305-a into the backhaul network 300. For example, SS transmissions from the second relay node 305-b, one or more other relay nodes 305-b, or combinations thereof, may be configured to occur within a certain time and frequency window, and this window may be indicated to the first relay node 305-a via the other RAT to allow for a more focused search at the first relay node 305-a. In other examples, SS transmissions from the second relay node 305-b, one or more other relay nodes 305-b, or combinations thereof, may be configured to be staggered over time to enhance the likelihood of detection at the first relay node 305-*a*.

In some cases, the second relay node 305-*b* may signal its access configuration, the access configuration of one or more other relay nodes 305, or combinations thereof. Such signaling may be provided using broadcast signals, such as in system information blocks broadcast by the second relay node 305-*b* (e.g., MIB, SIB, min SI, RMSI), which may be received at the first relay node 305-*a* and other relay nodes 305. In some cases, the signaling may be provided through unicast or dedicated signals to one or more other relay nodes 305 (e.g., to a sub-6 node (such as a node operating in radio frequency spectrum bands below 6 GHz) or an LTE node and the information may be provided to the first relay node 305-*a* using a different RAT). In some cases, the second relay node 305-*b* may indicate some beam-related information and configuration (e.g., based on the measurement it has done based on the first relay node 305-*a* SS/reference signal) during a random access procedure (e.g., in message 2 or message 4), or after a random access procedure (e.g., using radio resource control (RRC) messages).

In other cases, as indicated above, the second relay node 305-*b* (or another relay node 305 of the backhaul network 300) may transmit a response signal to the first relay node 305-*a* in the form of a random access request that is transmitted to the first relay node that requests the first relay node 305-*a* join the backhaul network 300. In such cases, the second relay node 305-*b* may first detect the presence of the first relay node 305-*a*, and acquire the state, schedule, and configuration of the first relay node 305-*a* (e.g., transmitted in the SS/reference signal from the first relay node 305-*a*), and may additionally do some channel or beam measurements.

In some examples this procedure may be assisted or invoked by another (e.g., lower frequency) RAT, similarly as discussed above. For example, the second relay node 305-*b* may be notified by another RAT of the presence of the first relay node 305-*a* and may then attempt to detect SS/reference signal transmissions from the first relay node 305-*a*. The second relay node 305-*b* may be provided access configuration associated with the first relay node 305-*a* to assist in receiving the SS/reference signal transmissions from the first relay node 305-*a* and transmitting a random access request to the first relay node 305-*a*. In some cases, the second relay node 305-*b* may share all or part of this information with another relay node(s) 305, or a central entity in the network. In some cases, the second relay node 305-*b* may determine to transmit a random access request to the first relay node 305-*a*. In some cases, such a determination may be made by the second relay node 305-*b* itself, based on an indication to do so received from the central entity, based on an indication received from another relay node 305, or may be a collective determination of two or more relay nodes 305.

In some cases, the random access procedure, resources, and configuration for such a random access request may be different than a random access request used by RRC-idle nodes, used for initial access, used for beam recovery or sending a scheduling request, or used for handover. Because the second relay node 305-*b* has some information related to the configuration of the first relay node 305-*a*, the random access request may provide additional or different information. In some cases, a specific resource/configuration and random access mechanism may be indicated by the first relay node 305-*a* (e.g., through broadcast system information such as MIB, SIB, minSI, RMSI, etc.), may be preconfigured (e.g., according to a specification), may be determined by the second relay node 305-*b* or the central entity, may be determined by another relay node 350 and indicated to the second relay node 305-*b*, or any combinations thereof.

In cases where the second relay node 305-*b* transmits the random access request to the first relay node 305-*b*, the first relay node 305 needs to obtain time and frequency reference information of the backhaul network 300 and the second relay node 305-*b*. In some examples, the second relay node 305-*b* may explicitly provide commands to align the time and frequency reference of the first relay node 305-*a* node with its own. Such commands may indicate, for example, the required shift in frequency, time, or both (e.g., sample, symbol, slot, subframe or frame level). In some examples, the second relay node 305-*b* may provide the first relay node 305-*a* with resource and configuration information to receive SS/reference signal transmissions from the second relay node 305-*b* and also acquire system information. Such resource and configuration information may be determined specific to the first relay node 305-*a*, or may be cell-specific (e.g., broadcast) transmissions by the second relay node 305-*b*. In some cases, the information and indications of the various different examples may be provided during the random access procedure, or after the random access procedure (e.g., using RRC messages).

As indicated above, in some cases the random access procedure, resources, and configuration may be different from other random access procedures. In some cases, the random access procedure where the second relay node 305-*b* transmits a random access request to the first relay node 305-*a* may use specific random access preamble(s) and/or resources, which may be different and non-overlapping with other random access preambles. Additionally or alternatively, a power control mechanism of random access preamble (e.g., initial transmit power, steps to increase the transmit power, behavior when retransmitting the random access preamble using the same or different beam, etc.) may also be different (e.g., by allowing for higher transmit power). In some examples, the number of random access preambles sent during a random access occasion can be more than otherwise transmitted in a random access procedure. In some cases, the configuration and resources to transmit/receive a random access response (e.g., message 2), and/or other random access messages (e.g., message 3, message 4) may be different, the content of the random access response may be different, multiple random access responses may be transmitted within the random access response window, one or more random access messages may not be transmitted, or any combination thereof.

In some cases, upon detection of the specific random access preamble, the first relay node 305-*a* may refrain from sending a random access response (e.g., message 2), and instead try to receive a second message from the second relay node 305-*b* within a window, such as a window that may be the same or different as the first relay node 305-*a* original random access response window. The first relay node 305-*a*, in some cases, may send a random access response (e.g., message 2), which may be modified to acknowledge reception of a specific random access preamble. The random access response may or may not schedule resources and configuration for a third message from the second relay node 305-*b*. The third message may or may not be transmitted on the resources indicated in the random access response.

In some cases, the second relay node 305-*b* may send a message (e.g., after the random access preamble) to the first relay node 305-*a* to provide resources and configuration for further communications. Such a message may be sent as a response to a message received (e.g., a random access response) from the first relay node 305-*a*. In some cases, this message may be sent without receiving any response from the first relay node 305-*a*. In some cases, while the initial messages (e.g., message 1 and message 2) may or may not be the same as other random access procedures, the third message (e.g., message 3) may have an indication about the purpose of the procedure, such as asking the first relay node 305-*a* to join the backhaul network 300 of second relay node 305-*b*, and providing the first relay node 305-*a* with required resources and configuration.

In some cases, the first relay node 305-*a* may have been previously connected to the backhaul network 300, and may need to re-integrate with the backhaul network 300 after being disconnected. For example, the first relay node 305-*a* may have experienced a beam failure of a transmission beam used for the backhaul link 310-*c*. Of course, various other situations may occur that may result in the first relay node 305-*a* needing to re-integrate with the backhaul network 300 (e.g., following a power failure, following maintenance, a hardware reset, etc.). In some cases, the first relay node 305-*a* may perform an initial system acquisition procedure, such as discussed above. In other cases, the second relay node 305-*b* may identify that the first relay node 305-*a* lost connection. In some cases, the second relay node 305-*b* may have been connected to the first relay node 305-*a* previously, and may determine the connection is lost (e.g., the second relay node 305-*b* provided an access node function (ANF) or was a master node of the first relay node 305-*a*). In some cases, the second relay node 305-*b* may not have been connected to the first relay node 305-*a*, but may be notified by another network entity that the first relay node 305-*a* has lost connection. In other examples, the second relay node 305-*b* may receive a signal from the first relay node 305-*a* (e.g., an "I_AM_LOST" signal). In some cases, such a signal from the first relay node 305-*a* may be a sweeping SS/reference signal transmission from the first relay node 305-*a* that the first relay node 305-*a* would normally transmit, such as an SS/reference signal with a flag (e.g., a one-bit indication) that the first relay node 305-*a* is lost. Additionally or alternatively, the second relay node 305-*b* may report detection of the first relay node 305-*a* SS/reference signal to the network and may be informed by the network that the first relay node 305-*a* is lost.

In some cases, the second relay node 305-*b* may assist to re-integrate the first relay node 305-*a*. In some examples, the second relay node 305-*b* may modify one or more parameters for transmissions of a SS/reference signal, and monitoring for random access requests, similarly as discussed above for initial access. In other examples, the second relay node 305-*b* may transmit a random access request to the first relay node 305-*a* and ask the first relay node 305-*a* to join the backhaul network 300, similarly as discussed in above for initial access. In further examples, the second relay node 305-*b* may page the first relay node 305-*a*. In examples where paging is used, there might be no data for the first relay node 305-*a*, and the purpose of paging is to locate and re-integrate the first relay node 305-*a*. In some cases, the configuration (e.g., beam-related parameters) of such a paging signal may be determined specific to the first relay node 305-*a* (e.g., based on the detected signals from the first relay node 305-*a*). In some cases, the second relay node 305-*b* may transmit a message to the first relay node using a beam that is likely to be received at the first relay node 305-*a*, such as a beam that is linked to one or more SS/reference signal transmissions of the first relay node 305-*a*. In some cases, a network entity may identify which node should assist the first relay node 305-*a* in re-integration. In some cases, the network entity may allocate additional resources for such a transmission to locate and re-integrate the first relay node 305-*a*. Information related to such messages (e.g., frequency, paging occasion, etc.) may be conveyed to the first relay node 305-*a* beforehand by the network through one or more combinations of PDCCH, RRC signaling, other signaling, or combinations thereof.

As indicated above, in some examples where the first relay node 305-*a* is to be re-integrated with the backhaul network 300, second relay node 305-*b* may modify its SS parameters, channel state information reference signal (CSI-RS) parameters, random access transmission/reception configuration, or any combination thereof. For example, the second relay node 305-*b* or all relay nodes 305 within a certain distance of the first relay node 305-*a*, may start transmitting SS transmissions. In some cases, such transmissions may be transmitted within a preconfigured window for the first relay node 305-*a*. In some cases, some specific contention-free random access preamble(s) may be locally reserved for the first relay node 305-*a* across different cells, or a subset of random access preambles may be allocated to the relays that would like to re-integrate. Which mechanisms for re-integration is selected may be, in some cases, decided by the second relay node 305-*b*, or indicated to the second relay node 305-*b* (e.g., by the central entity), or collectively decided by a group of relay nodes 305. In some cases, the determination may depend on the schedule, capabilities, state (e.g., active or power saving) of the second relay node 305-*b*, the first relay node 305-*a*, other relay nodes 305, or any combination thereof. For example, if the second relay node 305-*b* is not in power saving mode and has some ongoing communications the second relay node 305-*b* may modify its SS transmissions. If the second relay node 305-*b* is in power saving mode, the second relay node 305 may transmit a random access request transmission.

In some cases, after the first relay node 305-*a* is integrated with the backhaul network 300, it may be paged. In some cases, the first relay node 305-*a* may be in power saving mode and needs to be paged. While in power saving mode, the first relay node 305-*a* may occasionally send SS/reference signal transmission and may listen to random access requests (e.g., for one or more UEs 115 or other relay nodes 305 to access the network). Thus, the second relay node 305-*b* may transmit a random access request to the first relay node 305-*a* in order to page it.

Figure 4:
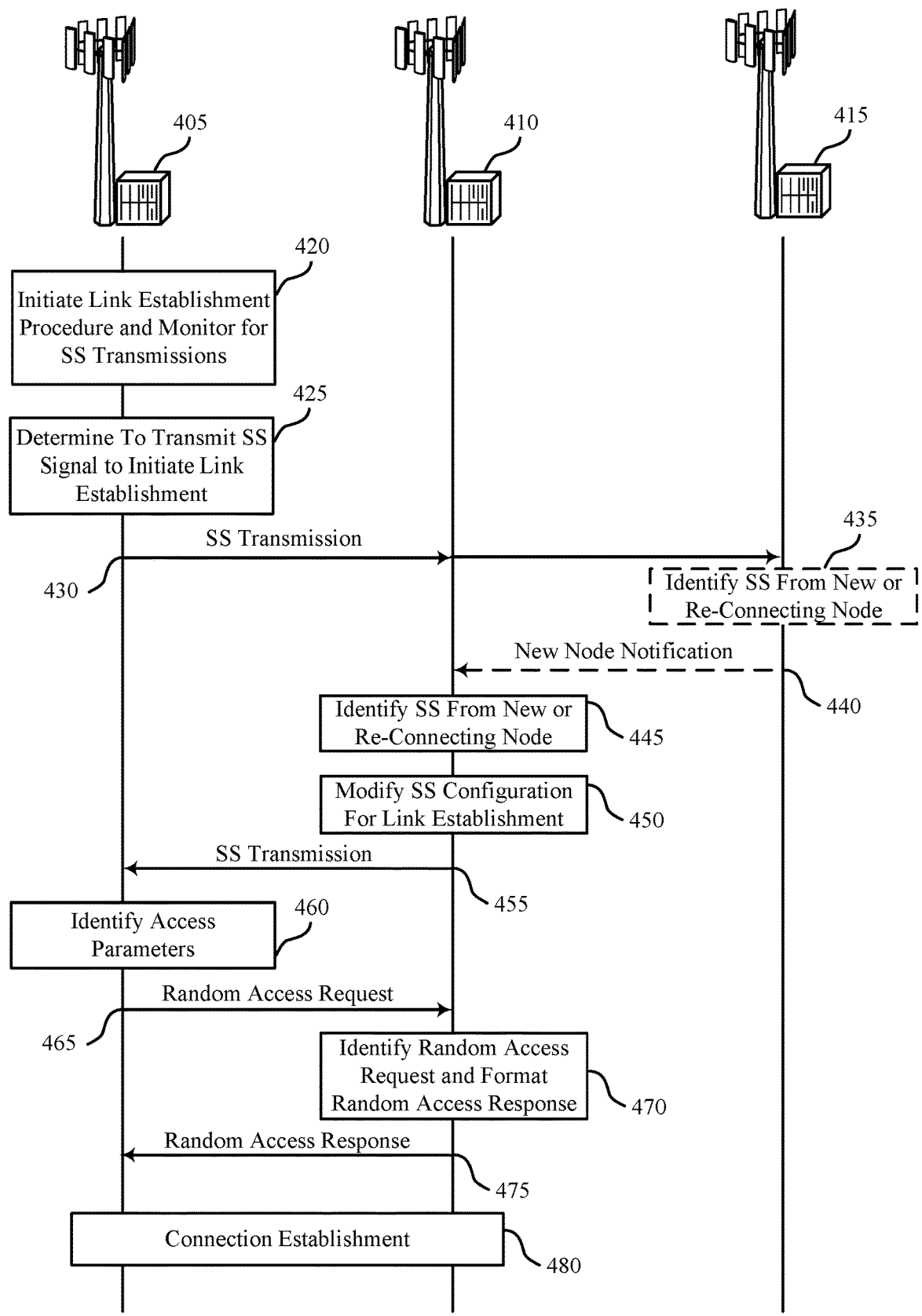
FIG. 4 illustrates an example of a process flow in accordance with aspects of the present disclosure.

FIG. 4 illustrates an example of a process flow 400 in accordance with various aspects of the present disclosure. In some examples, process flow 400 may implement aspects of wireless communications system 100 or 200. Process flow 400 may include a first node 405, a second node 410, and a third node 415, which may each be examples of the base stations 105 or relay nodes 305 such as described with reference to FIGS. 1-3. In this example, the second node 410 and the third node 415 may be established in a wireless network, and the first node 405 may seek to join the network.

In this example, at 420, the first node 405 may initiate wireless link establishment procedure and monitor for SS transmissions. In some cases, the first node 405 may monitor for SS transmissions according to a beam sweeping procedure in which SS blocks may be monitored across multiple beam directions. In the event that the first node 405 detects an SS transmission, the first node may transmit a random access request based on the SS transmission that was detected and initiate access to the network. In some cases, SSs (e.g., PSS/SSS/DMRS of PBCH), reference signals (e.g., CSI-RS), or both, may be used for mobility and random access association for network access. Thus, in some cases, a node may monitor for SS transmissions, reference signal transmissions, or both. Accordingly, while SS transmissions are discussed in various examples, nodes may transmit and receive reference signal transmissions in addition to, or instead of, SS transmissions.

At 425, the first node 405 may determine to transmit an SS to initiate a link establishment. In some cases, the first node 405 may make such a determination based on failing tot detect an SS transmission of another node for a certain period of time. In some cases, the first node 405 may be preconfigured with a timer, following the expiration of which, when the first node does not detect an SS transmission, the first node 405 may transmit an SS transmission 430. In some cases, the SS transmission may be transmitted as a series of SS blocks transmitted according to a beam sweeping pattern.

At optional block 435, the third node 415 may detect the SS transmission 430 from the first node and identify the SS as being from a new node or from a re-connecting node. The third node 415 may transmit a new relay notification 440 to the second node 410.

At 445, the second node 410 may identify that an SS from a new or re-connecting node is present. In some cases, the second node 410 may detect the SS transmission 430 directly. In other cases, the second node 410 may receive an indication of a new or re-integrating node from another node or network entity, such as the notification 440 from the third node 415 in this example.

At 450, the second node 410 may modify its SS configuration for backhaul link establishment. In some cases, the second node 410 may transmit additional SS transmissions, SS transmissions in a certain beam direction, or on additional resources to enhance the likelihood that the first node 405 receives the SS transmission. The second node 410 may transmit SS transmissions 455, which may be a response signal to the SS transmission 430 of the first node 405.

At 460, the first node 405 may identify access parameters for transmitting a random access request. In some cases, the access parameters may include random access resources for transmitting a random access request 465 to the second node 410. In some cases, the access parameters may include a beam direction and resources for transmission of the random access request 465.

At 470, the second node 410 may identify the random access request, and may format a random access response. In some cases, the random access response may provide information for further transmissions to initiate a connection establishment. The second node 410 may transmit random access response 475, and the first node 405 and the second node 410 may perform connection establishment 480 in accordance with connection establishment techniques.

Figure 5:
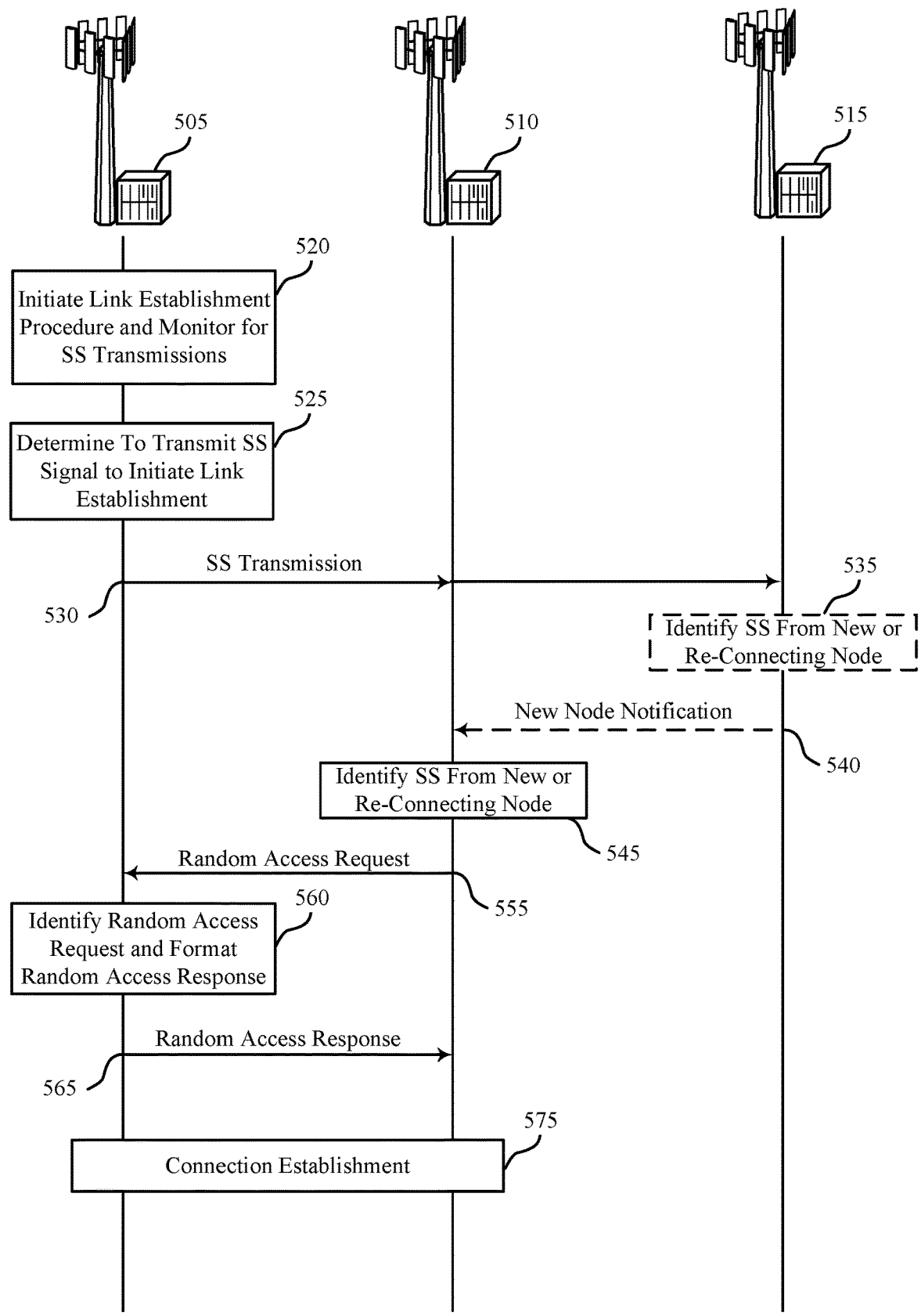
FIG. 5 illustrates an example of another process flow in accordance with aspects of the present disclosure.

FIG. 5 illustrates an example of a process flow 500 in accordance with various aspects of the present disclosure. In some examples, process flow 500 may implement aspects of wireless communications system 100 or 200. Process flow 500 may include a first node 505, a second node 510, and a third node 515, which may each be examples of the base stations 105 or nodes 305 such as described with reference to FIGS. 1-3. In this example, the second node 510 and the third node 515 may be established in a wireless network, and the first node 505 may seek to join the network.

In this example, at 520, the first node 505 may initiate a link establishment procedure and monitor for SS transmissions. In some cases, the first node 505 may monitor for SS transmissions according to a beam sweeping procedure in which SS blocks may be monitored across multiple beam directions. In the event that the first node 505 detects an SS transmission, the first node 505 may transmit a random access request based on the SS transmission that was detected and initiate access to the network.

At 525, the first node 505 may determine to transmit an SS to initiate a link establishment. In some cases, the first node 505 may make such a determination based on failing to detect an SS transmission of another node for a certain period of time. In some cases, the first node 505 may be preconfigured with a timer, following the expiration of which, when the first node 505 does not detect an SS transmission, the first node 505 may transmit an SS transmission 530. In some cases, the SS transmission may be transmitted as a series of SS blocks transmitted according to a beam sweeping pattern.

At optional block 535, the third node 515 may detect the SS transmission 530 from the first node 505 and identify the SS as being from a new node or from a re-connecting node. The third node 515 may transmit a new node notification 540 to the second node 510.

At 545, the second node 510 may identify that an SS from a new or re-connecting node is present. In some cases, the second node 510 may detect the SS transmission 530 directly. In other cases, the second node 510 may receive an indication of a new or re-integrating node from another node or network entity, such as the notification 540 from the third node 515 in this example. The second node 545 may, in this example, transmit a random access request 555 to the first node 505 to ask the first node 505 to join the network. Thus, the random access request 555 may be a response signal to the SS transmission 530 of the first node 505.

At 560, the first node 505 may identify the random access request and format a random access response. The first node 505 may transmit random access response 565 to the second node 510, in a manner such as discussed above. The first node 505 and the second node 510 may then perform a connection establishment 575 in accordance with connection establishment techniques.

Figure 6:
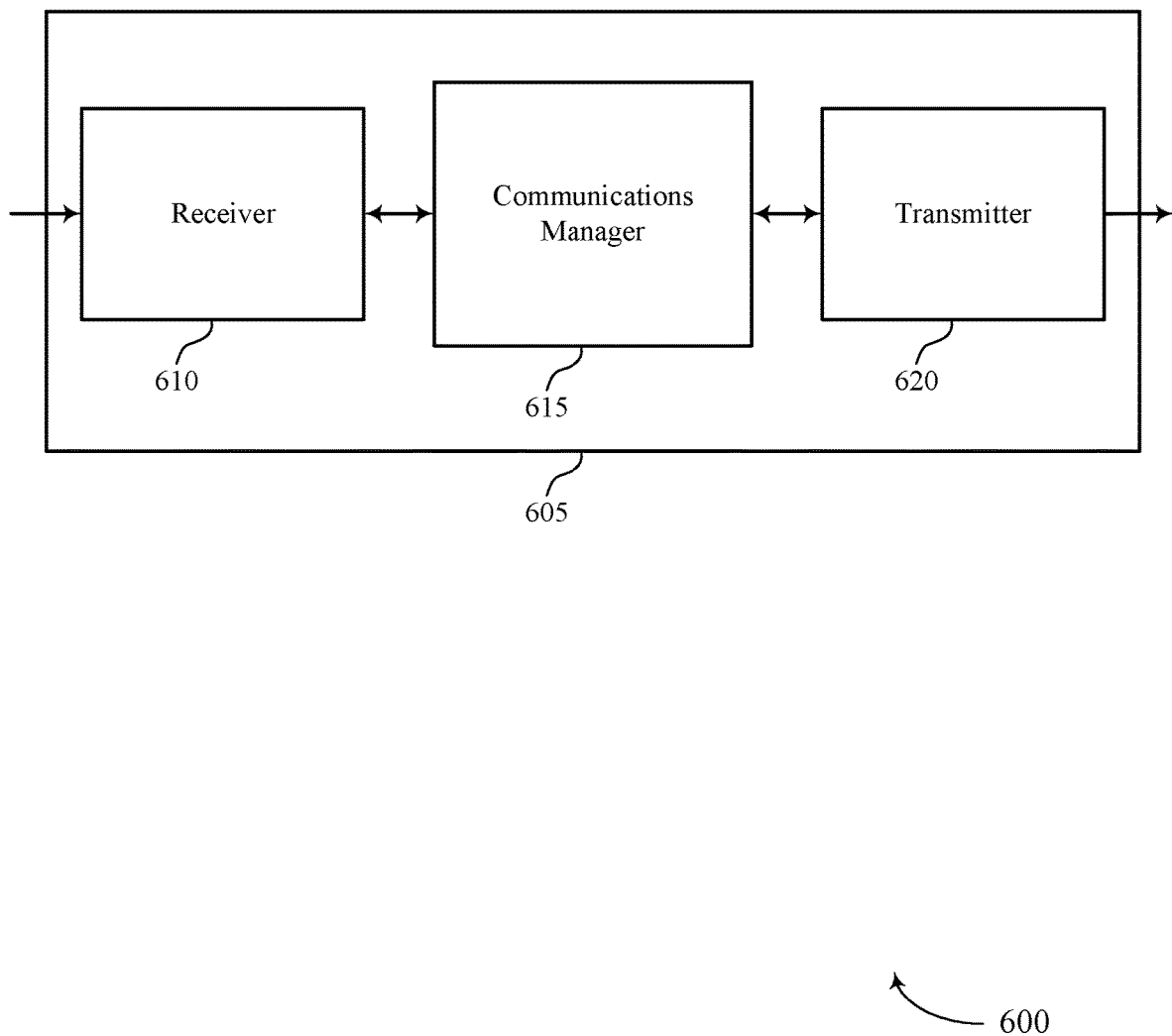
FIGS. 6 through 8 show block diagrams of a device in accordance with aspects of the present disclosure.

FIG. 6 shows a block diagram 600 of a wireless device 605 in accordance with aspects of the present disclosure. Wireless device 605 may be an example of aspects of a base station 105 or node as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to node connection techniques in wireless backhaul systems, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9. Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may transmit, from a first node seeking to join a network (e.g., a relay node seeking to join a backhaul network), a first SS, where the network provides access to a core network of a wireless communication system, and where the first node is seeking to establish a wireless link between the first node and one or more other nodes of the backhaul network, receive, at the first node, a response signal from a second node that is established in the network, and establish the wireless link with the second node based on the response signal from the second node.

The communications manager 615 may also receive, at a second node, a first SS from a first node, where the second node is established in a network that provides access to a core network of a wireless communication system, and where the first node is seeking to join the network, transmit a response signal to the first node, the response signal based on the first SS, and establish a wireless link with the first node based on the response signal and the first SS.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
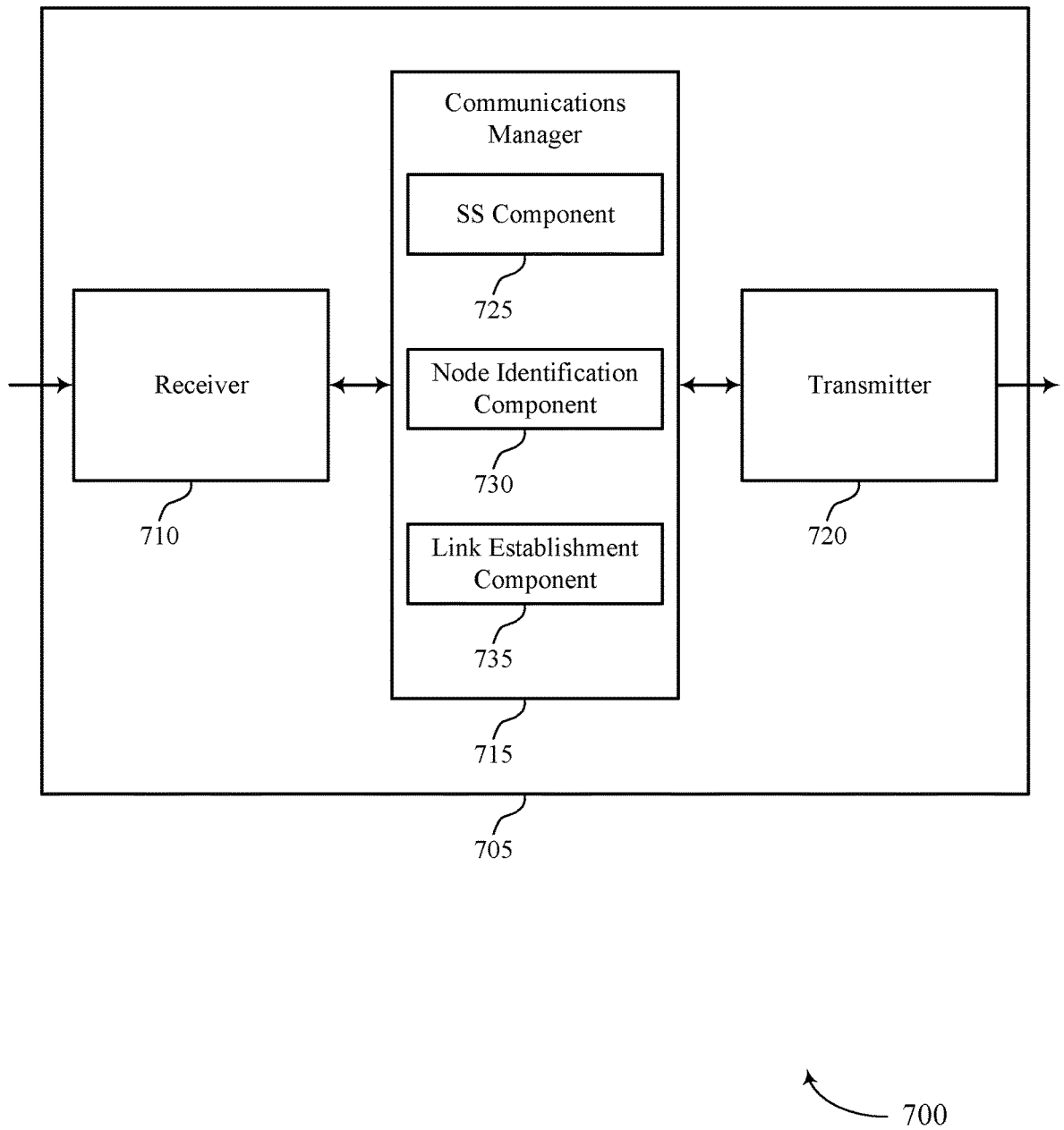

FIG. 7 shows a block diagram 700 of a wireless device 705 in accordance with aspects of the present disclosure. Wireless device 705 may be an example of aspects of a wireless device 605 or a base station 105 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to node connection techniques in wireless systems, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include SS component 725, node identification component 730, and link establishment component 735.

SS component 725 may transmit, from a first node seeking to join a network, a first SS, where the network provides access to a core network of a wireless communication system, and where the first node is seeking to establish a wireless link between the first node and one or more other nodes of the network. In some cases, SS component 725 may be associated with a second node, and may receive a first SS from a first node, where the second node is established in a network that provides access to a core network of a wireless communication system, and where the first node is seeking to join the network. In some cases, the first node transmits the first SS or first reference signal prior to detecting one or more transmissions of the second node. In some cases, the first SS includes information for generating a random access request at the second node. In some cases, the transmitting the response signal includes transmitting a second SS to the first node that indicates an access configuration of the second node, or transmitting a random access request message to the first node based on the first SS, that requests the first node join the network. In some cases, the SS component 725 may transmit, from a first node seeking to join a network, a first SS, wherein the first node is seeking to establish a wireless link between the first node and one or more other nodes of the network.

Node identification component 730 may be associated with a first node that is not established in a network, or with a second node that is established with the network. In some cases, node identification component 730 may receive, at the first node, a response signal from a second node that is established in the network. In some cases where node identification component 730 is associated with the second node, the node identification component 730 may transmit a response signal to the first node, the response signal based on the first SS. In some cases, node identification component 730 may determine, prior to transmitting the response signal, whether to transmit the second SS or the random access request message based on one or more of a schedule of transmissions, a capability of the first node, a power mode of the second node, an indication from one or more other nodes of the network, or any combination thereof. In some cases, a power of the random access request is based on a measured power of the first SS. In some examples, the node identification component 730 may receive, at the first node, a second SS from a second node that is established in the network.

In some cases, where node identification component 730 is associated with the first node, the node identification component 730 may receive a second SS from the second node, the second SS transmitted using a beam directed toward the first node and including access configuration information of the second node. In some cases, the access configuration information of the second node includes one or more of a random access preamble for a random access request, a number of antenna ports for the random access request, random access resources for transmitting the random access request, power control information for transmitting the random access request, or any combination thereof. In some cases, the receiving the response signal includes receiving a second SS from the second node, the second SS including access configuration information of a third node. In some cases, the receiving the response signal includes receiving a second SS from the second node, and identifying an access configuration of the second node based on information contained in the second SS.

In some cases, the transmitting the response signal includes transmitting, from the second node, a second SS using a beam directed toward the first node and including access configuration information of the second node. In some cases, the access configuration information of the second node includes one or more of a random access preamble for a random access request, a number of antenna ports for the random access request, random access resources for transmitting the random access request, power control information for transmitting the random access request, or any combination thereof. In some cases, the first SS includes information for generating a random access request at the second node. In some cases, the response signal is a random access request from the second node, and where the second node transmits one or more commands to align a time reference and frequency reference of the first node to corresponding references of the second node.

Link establishment component 735 may establish the wireless link with the second node based on the response signal from the second node. In some cases, link establishment component 735 may establish an initial wireless link with the second node, determine that a loss of connection has occurred for the initial wireless link, and the transmitting and the receiving are performed responsive to the determining that the loss of connection has occurred. In some cases, link establishment component 735 may establish a wireless link with the first node based on the response signal and the first SS. In some cases, link establishment component 735 may be associated with the second node, and may transmit an indication of the first SS to one or more other nodes of the network. In some cases, the response signal is a random access request from the second node, and where the second node transmits one or more commands to align a time reference and frequency reference of the first node to corresponding references of the second node. In some cases, the one or more commands are transmitted in a random access procedure, in radio resource control signaling, or combinations thereof. In some cases, the transmitting the response signal includes transmitting, from the second node, a second SS that indicates access configuration information of a third node. In some cases, link establishment component 735 may establish the wireless link with the second node based at least in part on the first SS and the second SS.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
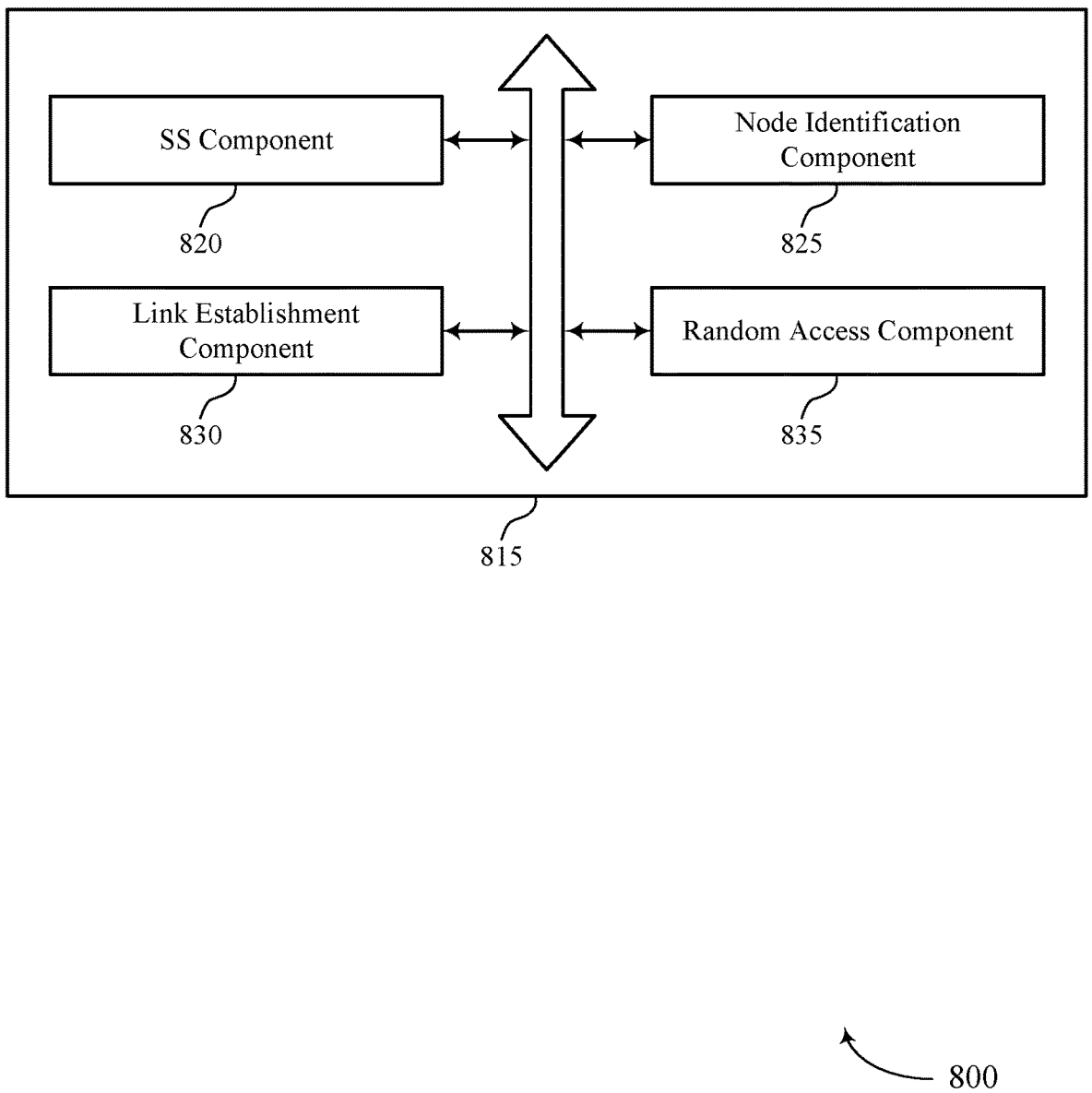

FIG. 8 shows a block diagram 800 of a communications manager 815 in accordance with aspects of the present disclosure. The communications manager 815 may be an example of aspects of a communications manager 615, a communications manager 715, or a communications manager 915 described with reference to FIGS. 6, 7, and 9. The communications manager 815 may include SS component 820, node identification component 825, link establishment component 830, and random access component 835. Each of these modules may communicate, directly or indirectly, with one another (e.g., via one or more buses).

SS component 820 may transmit, from a first node seeking to join a network, a first SS, where the network provides access to a core network of a wireless communication system, and where the first node is seeking to establish a wireless link between the first node and one or more other nodes of the network. In some cases, SS component 820 may be associated with a second node, and may receive a first SS from a first node, where the second node is established in a network that provides access to a core network of a wireless communication system, and where the first node is seeking to join the network. In some cases, the first node transmits the first SS prior to detecting one or more transmissions of the second node. In some examples, the first node may be a relay node and the network may comprise a backhaul network Additionally, the second node may be a relay node that is established in the backhaul network. In such cases, the first node may transmit the first SS prior to detecting one or more transmissions of the second node or another node of the backhaul network. In some cases, the first SS includes information for generating a random access request at the second node. In some cases, the transmitting the response signal includes transmitting a second SS to the first node that indicates an access configuration of the second node, or transmitting a random access request message to the first node based on the first SS, that requests the first node join the network.

Node identification component 825 may be associated with a first node that is not established in a network, or with a second node that is established with the network. In some cases, node identification component 825 may receive, at the first node, a response signal from a second node that is established in the network. In some cases where node identification component 825 is associated with the second node, the node identification component 825 may transmit a response signal to the first node, the response signal based on the first SS. In some cases, node identification component 825 may determine, prior to transmitting the response signal, whether to transmit the second SS or the random access request message based on one or more of a schedule of transmissions, a capability of the first node, a power mode of the second node, an indication from one or more other nodes of the network, or any combination thereof. In some cases, a power of the random access request is based on a measured power of the first SS.

In some cases, where node identification component 825 is associated with the first node, the node identification component 825 may receive a second SS from the second node, the second SS transmitted using a beam directed toward the first node and including access configuration information of the second node. In some cases, the access configuration information of the second node includes one or more of a random access preamble for a random access request, a number of antenna ports for the random access request, random access resources for transmitting the random access request, power control information for transmitting the random access request, or any combination thereof. In some cases, the receiving the response signal includes receiving a second SS from the second node, the second SS including access configuration information of a third node. In some cases, the receiving the response signal includes receiving a second SS from the second node, and identifying an access configuration of the second node based on information contained in the second SS.

In some cases, the transmitting the response signal includes transmitting, from the second node, a second SS using a beam directed toward the first node and including access configuration information of the second node. In some cases, the access configuration information of the second node includes one or more of a random access preamble for a random access request, a number of antenna ports for the random access request, random access resources for transmitting the random access request, power control information for transmitting the random access request, or any combination thereof. In some cases, the first SS includes information for generating a random access request at the second node. In some cases, the response signal is a random access request from the second node, and where the second node transmits one or more commands to align a time reference and frequency reference of the first node to corresponding references of the second node.

Link establishment component 830 may establish the wireless link with the second node based on the response signal from the second node. In some cases, link establishment component 830 may establish an initial wireless link with the second node, determine that a loss of connection has occurred for the initial wireless link, and the transmitting and the receiving are performed responsive to the determining that the loss of connection has occurred. In some cases, link establishment component 830 may establish a wireless link with the first node based on the response signal and the first SS. In some cases, link establishment component 830 may be associated with the second node, and may transmit an indication of the first SS to one or more other nodes of the network. In some cases, the response signal is a random access request from the second node, and where the second node transmits one or more commands to align a time reference and frequency reference of the first node to corresponding references of the second node. In some cases, the one or more commands are transmitted in a random access procedure, in radio resource control signaling, or combinations thereof. In some cases, the transmitting the response signal includes transmitting, from the second node, a second SS that indicates access configuration information of a third node.

Random access component 835 may manage random access at the node. In some cases, the establishing the wireless link with the second node includes transmitting a random access request message to the second node based on the access configuration of the second node. In some cases, the receiving the response signal includes receiving a random access request from the second node that requests the first node join the network. In some cases, the establishing the wireless link includes transmitting a random access response to the second node, and establishing the wireless link based on the random access response. In some cases, the receiving the response signal includes receiving a random access request from the second node having a random access preamble, or using a random access resource, that indicates a request that the first node join the network. In some cases, the receiving the response signal further includes receiving two or more random access messages that include information for establishing the wireless link. In some cases, the transmitting the response signal includes transmitting a random access request from the second node having a random access preamble, or using a random access resource, that indicates a request that the first node join the network. In some cases, the transmitting the response signal further includes transmitting two or more random access messages that include information for establishing the wireless link.

Figure 9:
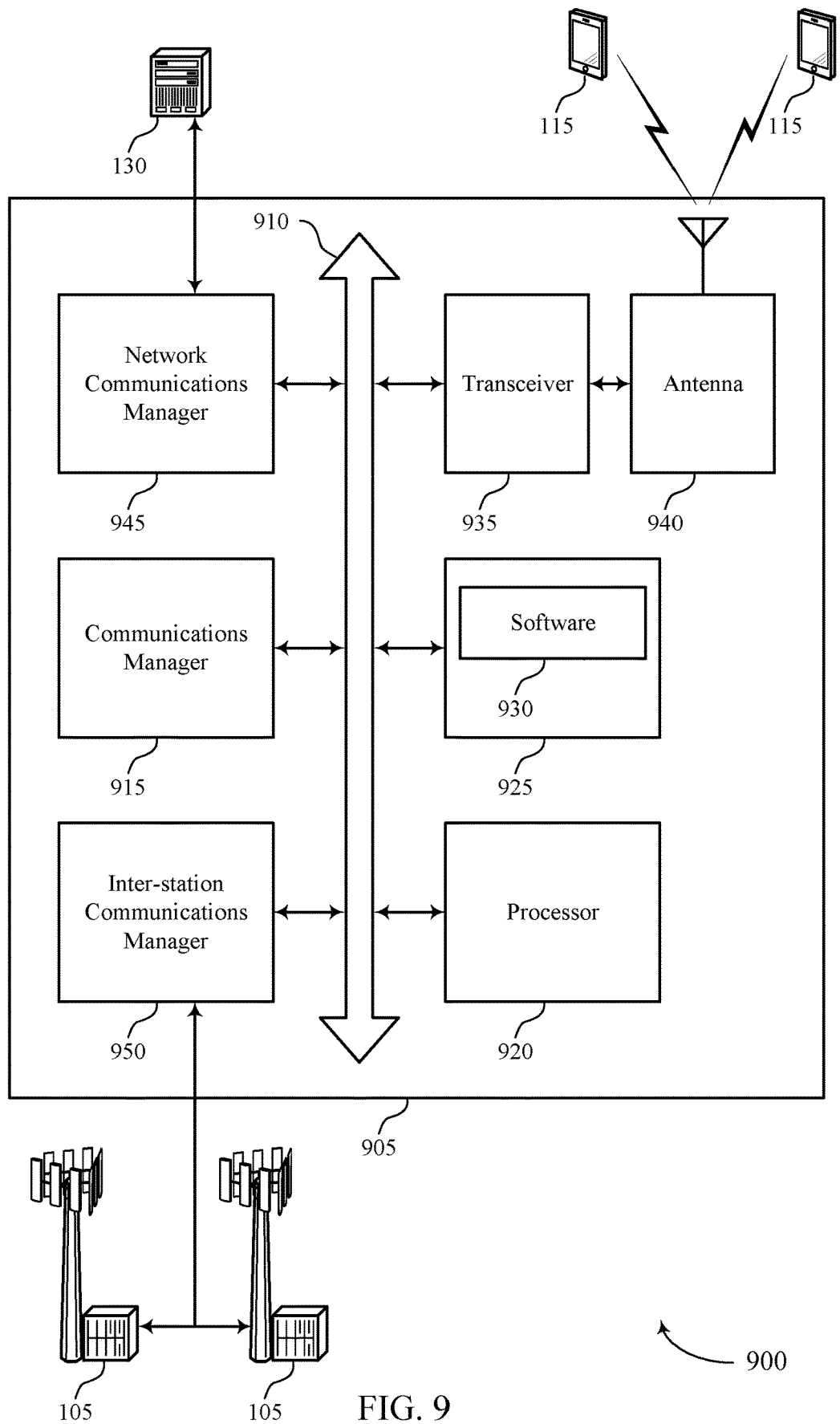
FIG. 9 illustrates a block diagram of a system including a base station in accordance with aspects of the present disclosure.

FIG. 9 shows a diagram of a system 900 including a device 905 in accordance with aspects of the present disclosure. Device 905 may be an example of or include the components of wireless device 605, wireless device 705, or a base station 105 as described herein, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more user equipment (UE)s 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting node connection techniques in wireless systems).

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support node connection techniques in wireless systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
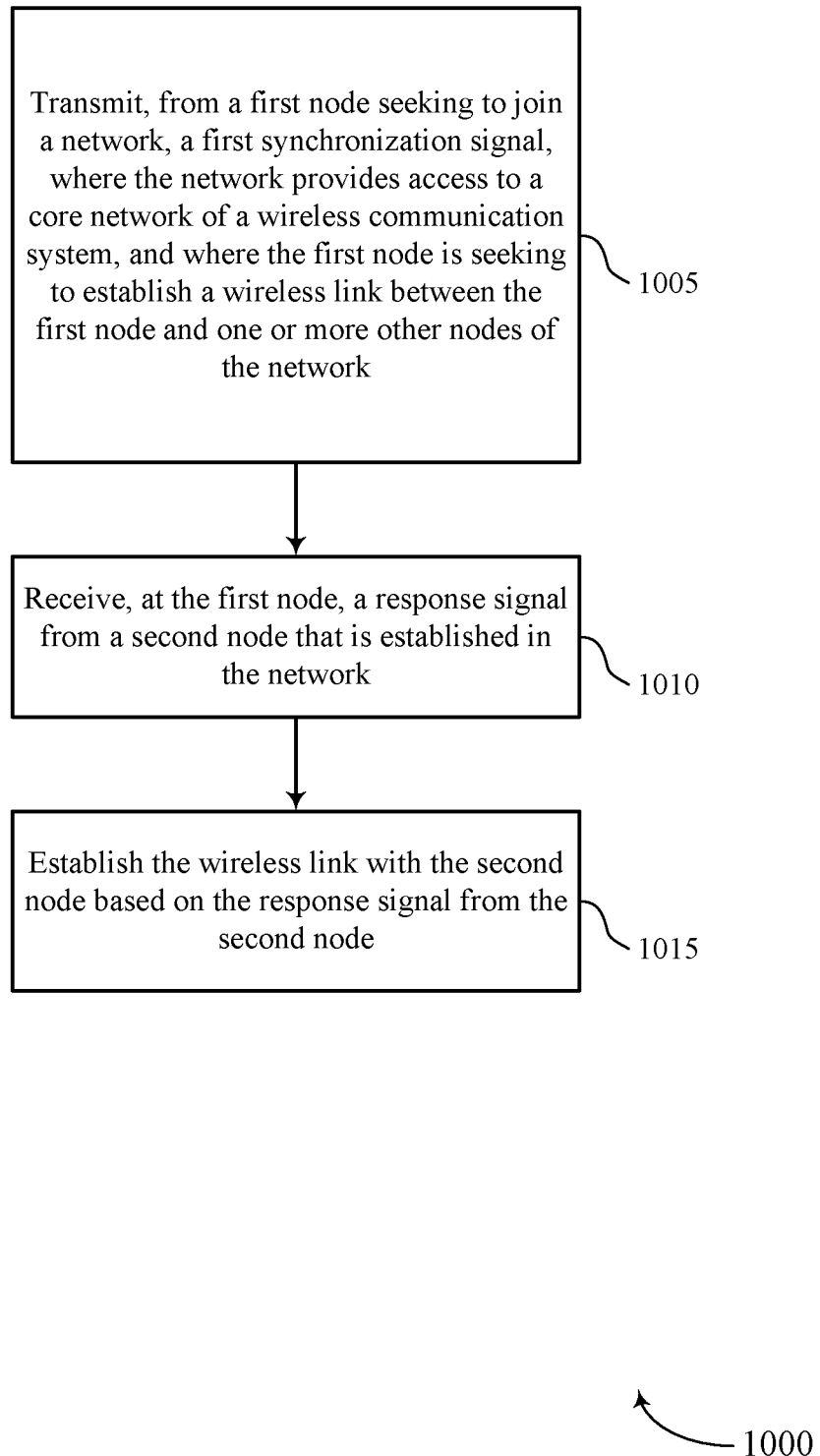
FIGS. 10 through 14 illustrate methods in accordance with aspects of the present disclosure.

FIG. 10 shows a flowchart illustrating a method 1000 in accordance with aspects of the present disclosure. The operations of method 1000 may be implemented by a base station 105, a node, or its components as described herein.

For example, the operations of method 1000 may be performed by a communications manager as described with reference to FIGS. 6 through 9. In some examples, a base station 105 or node may execute a set of codes to control the functional elements of the device to perform the functions described herein. Additionally or alternatively, the base station 105 or node may perform aspects of the functions described herein using special-purpose hardware.

At 1005 the base station 105 or node may transmit, from a first node seeking to join a network, a first SS, where the network provides access to a core network of a wireless communication system, and where the first node is seeking to establish a wireless link between the first node and one or more other nodes of the network. The operations of 1005 may be performed according to the methods described herein. In certain examples, aspects of the operations of 1005 may be performed by an SS component as described with reference to FIGS. 6 through 9.

At 1010 the base station 105 or node may receive, at the first node, a response signal from a second node that is established in the network. The operations of 1010 may be performed according to the methods described herein. In certain examples, aspects of the operations of 1010 may be performed by a node identification component as described with reference to FIGS. 6 through 9.

At 1015 the base station 105 or node may establish the wireless link with the second node based at least in part on the response signal from the second node. The operations of 1015 may be performed according to the methods described herein. In certain examples, aspects of the operations of 1015 may be performed by a link establishment component as described with reference to FIGS. 6 through 9.

Figure 11:
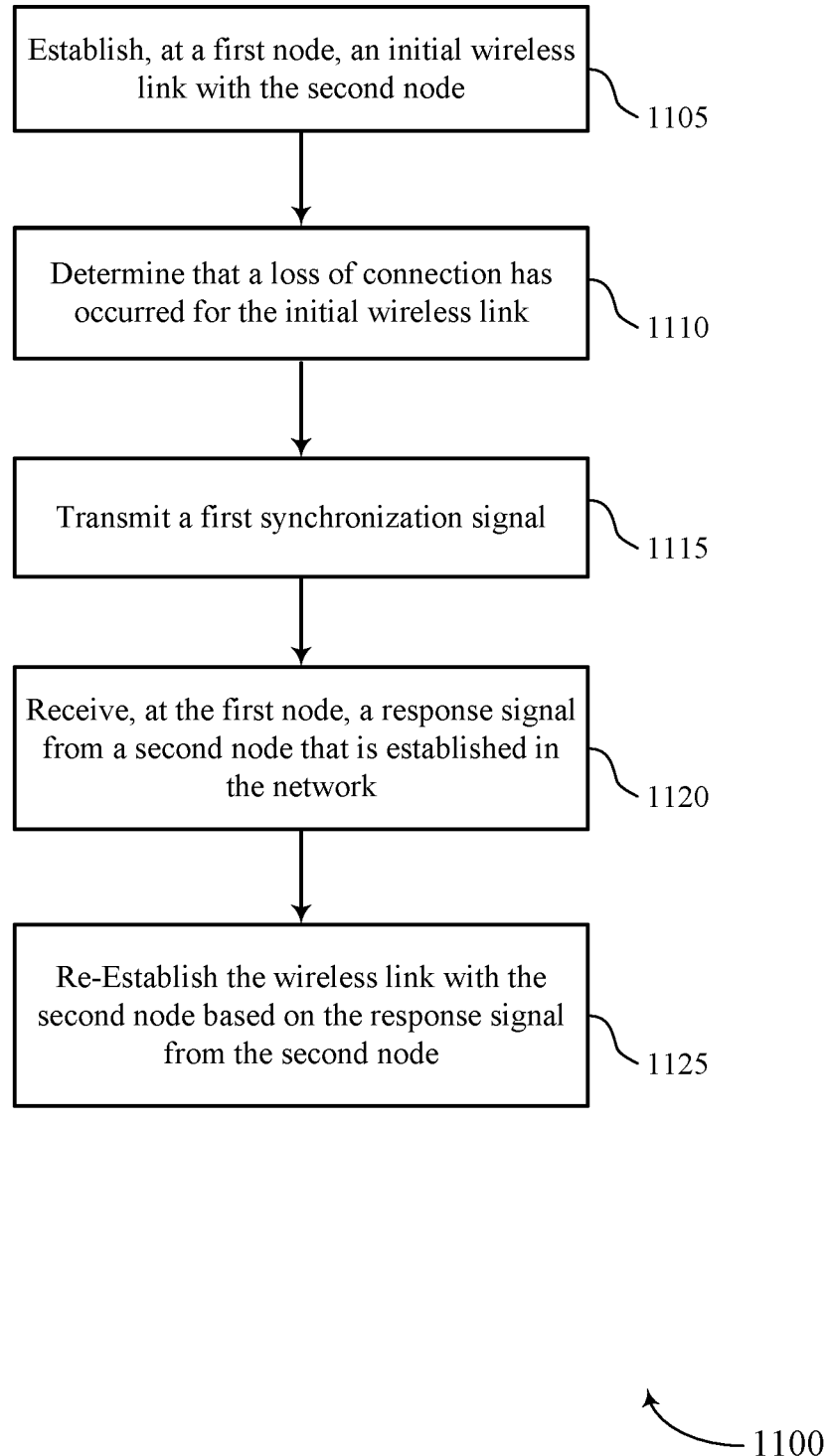

FIG. 11 shows a flowchart illustrating a method 1100 in accordance with aspects of the present disclosure. The operations of method 1100 may be implemented by a base station 105, or node, or its components as described herein. For example, the operations of method 1100 may be performed by a communications manager as described with reference to FIGS. 6 through 9. In some examples, a base station 105 may execute a set of codes to control the functional elements of the device to perform the functions described herein. Additionally or alternatively, the base station 105 may perform aspects of the functions described herein using special-purpose hardware.

At 1105 the base station 105 or node may establish an initial wireless link with the second node. The operations of 1105 may be performed according to the methods described herein. In certain examples, aspects of the operations of 1105 may be performed by a link establishment component as described with reference to FIGS. 6 through 9.

At 1110 the base station 105 or node may determine that a loss of connection has occurred for the initial wireless link. The operations of 1110 may be performed according to the methods described herein. In certain examples, aspects of the operations of 1110 may be performed by a link establishment component as described with reference to FIGS. 6 through 9.

At 1115 the base station 105 or node may transmit a first SS. The operations of 1115 may be performed according to the methods described herein. In certain examples, aspects of the operations of 1115 may be performed by an SS component as described with reference to FIGS. 6 through 9.

At 1120 the base station 105 or node may receive a response signal from a second node that is established in the network. The operations of 1120 may be performed according to the methods described herein. In certain examples, aspects of the operations of 1120 may be performed by a node identification component as described with reference to FIGS. 6 through 9.

At 1125 the base station 105 or node may re-establish the wireless link with the second node based on the response signal from the second node. The operations of 1125 may be performed according to the methods described herein. In certain examples, aspects of the operations of 1125 may be performed by a link establishment component as described with reference to FIGS. 6 through 9.

Figure 12:
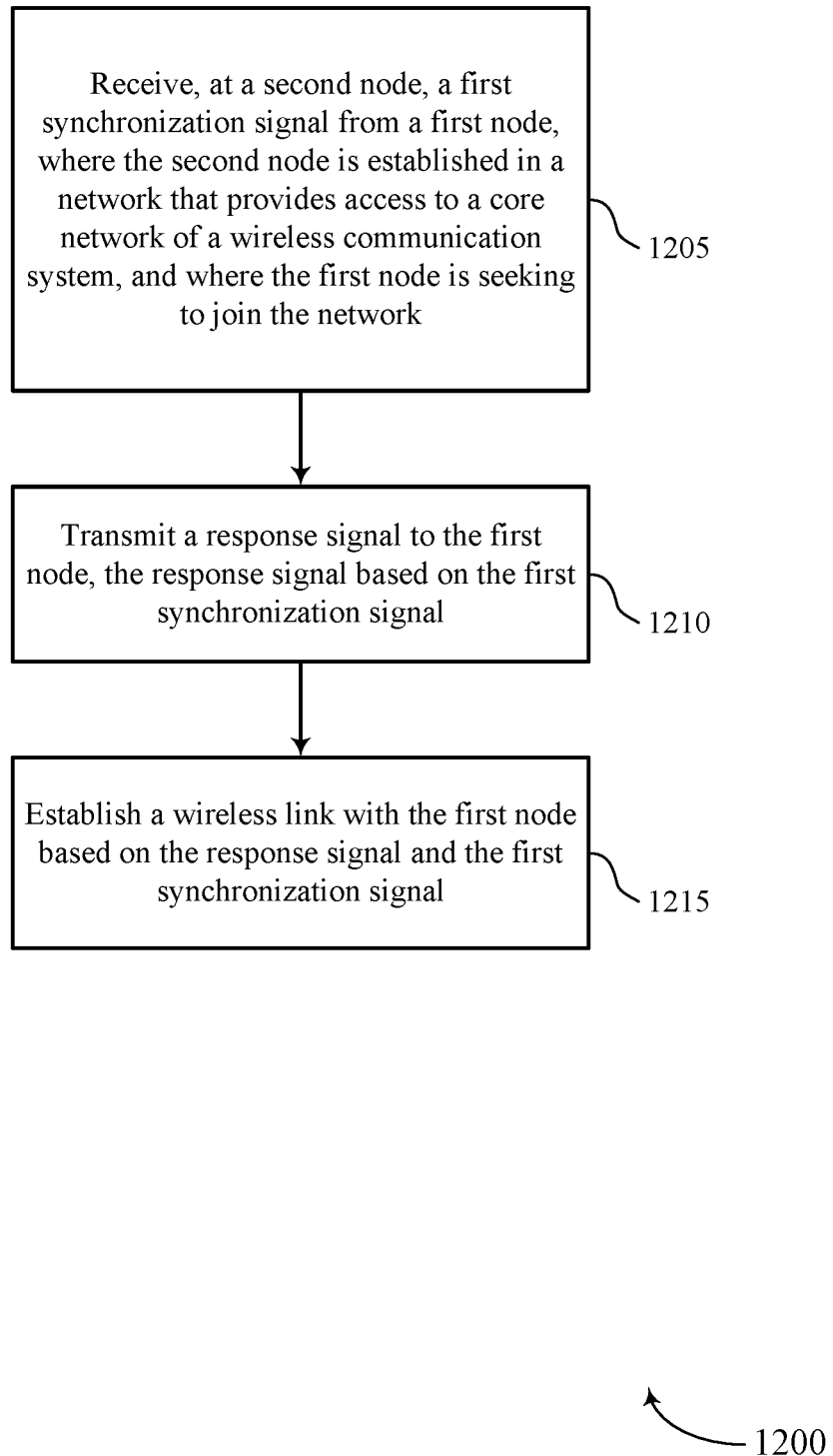

FIG. 12 shows a flowchart illustrating a method 1200 in accordance with aspects of the present disclosure. The operations of method 1200 may be implemented by a base station 105, or node, or its components as described herein. For example, the operations of method 1200 may be performed by a communications manager as described with reference to FIGS. 6 through 9. In some examples, a base station 105 may execute a set of codes to control the functional elements of the device to perform the functions described herein. Additionally or alternatively, the base station 105 or node may perform aspects of the functions described herein using special-purpose hardware.

At 1205 the base station 105 or node may receive, at a second node, a first SS from a first node, where the second node is established in a network that provides access to a core network of a wireless communication system, and where the first node is seeking to join the network. The operations of 1205 may be performed according to the methods described herein. In certain examples, aspects of the operations of 1205 may be performed by an SS component as described with reference to FIGS. 6 through 9.

At 1210 the base station 105 or node may transmit a response signal to the first node, the response signal based at least in part on the first SS. The operations of 1210 may be performed according to the methods described herein. In certain examples, aspects of the operations of 1210 may be performed by a node identification component as described with reference to FIGS. 6 through 9.

At 1215 the base station 105 or node may establish a wireless link with the first node based at least in part on the response signal and the first SS. The operations of 1215 may be performed according to the methods described herein. In certain examples, aspects of the operations of 1215 may be performed by a link establishment component as described with reference to FIGS. 6 through 9.

Figure 13:
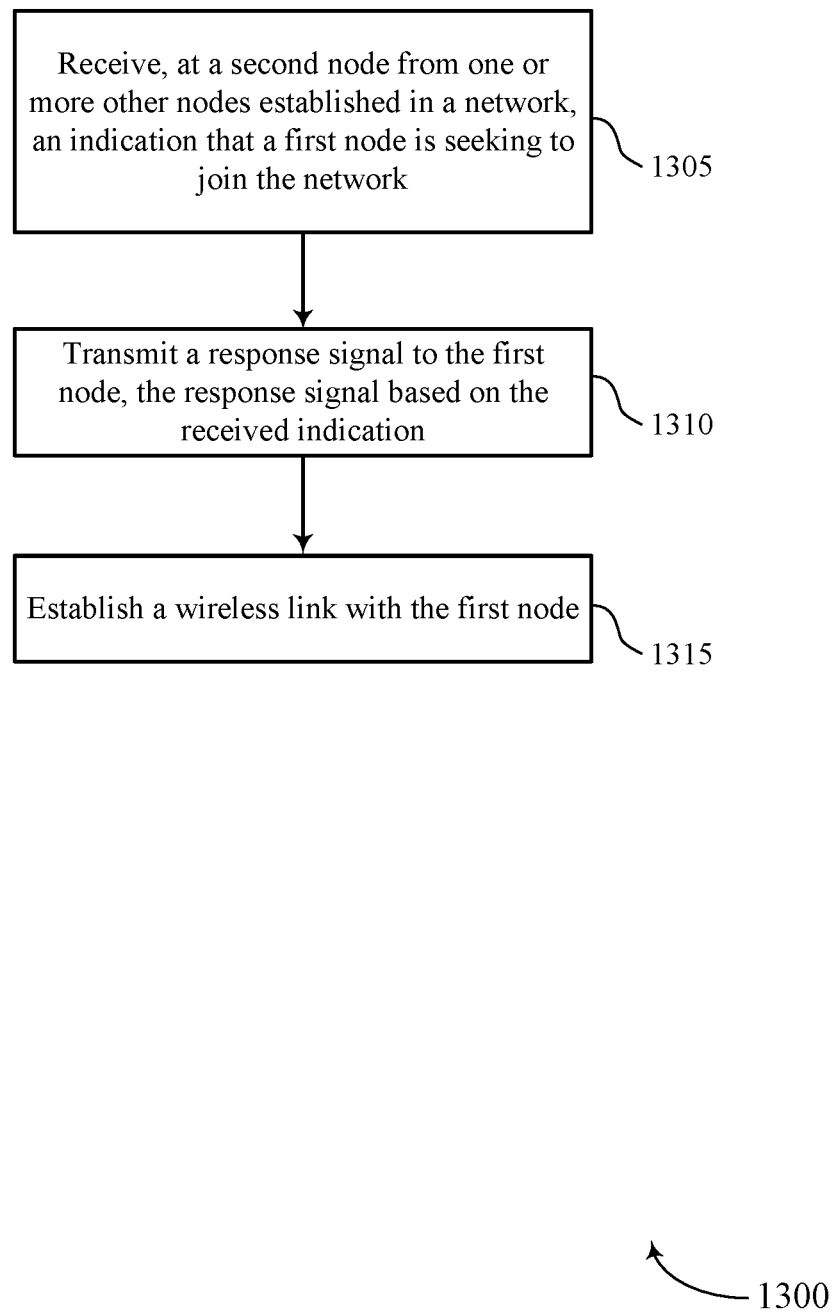

FIG. 13 shows a flowchart illustrating a method 1300 in accordance with aspects of the present disclosure. The operations of method 1300 may be implemented by a base station 105, or node, or its components as described herein. For example, the operations of method 1300 may be performed by a communications manager as described with reference to FIGS. 6 through 9. In some examples, a base station 105 may execute a set of codes to control the functional elements of the device to perform the functions described herein. Additionally or alternatively, the base station 105 or node may perform aspects of the functions described herein using special-purpose hardware.

At 1305 the base station 105 or node may receive from one or more other nodes established in a network, an indication that a first node is seeking to join the network. The operations of 1305 may be performed according to the methods described herein. In certain examples, aspects of the operations of 1305 may be performed by an SS component as described with reference to FIGS. 6 through 9.

At 1310 the base station 105 or node may transmit a response signal to the first node, the response signal based at least in part on the first SS. The operations of 1310 may be performed according to the methods described herein. In certain examples, aspects of the operations of 1310 may be performed by a node identification component as described with reference to FIGS. 6 through 9.

At 1315 the base station 105 or node may establish a wireless link with the first node. The operations of 1315 may be performed according to the methods described herein. In certain examples, aspects of the operations of 1315 may be performed by a link establishment component as described with reference to FIGS. 6 through 9.

Figure 14:
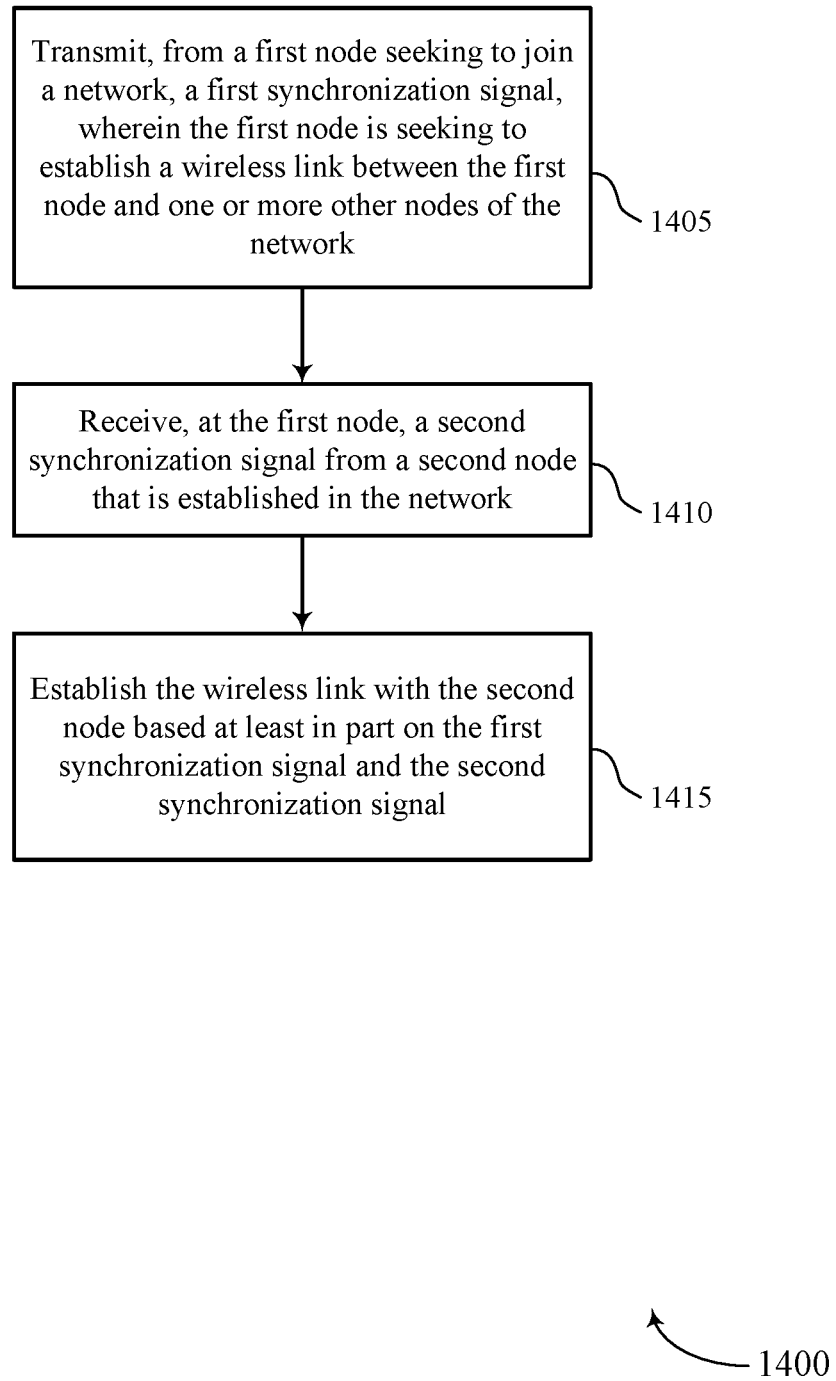

FIG. 14 shows a flowchart illustrating a method 1400 in accordance with aspects of the present disclosure. The operations of method 1400 may be implemented by a base station 105, a node, or its components as described herein. For example, the operations of method 1400 may be performed by a communications manager as described with reference to FIGS. 6 through 9. In some examples, a base station 105 or node may execute a set of codes to control the functional elements of the device to perform the functions described herein. Additionally or alternatively, the base station 105 or node may perform aspects of the functions described herein using special-purpose hardware.

At 1405 the base station 105 or node may transmit, from a first node seeking to join a network, a first SS, wherein the first node is seeking to establish a wireless link between the first node and one or more other nodes of the network. The operations of 1405 may be performed according to the methods described herein. In certain examples, aspects of the operations of 1405 may be performed by an SS component as described with reference to FIGS. 6 through 9.

At 1410 the base station 105 or node may receive, at the first node, a second SS from a second node that is established in the network. The operations of 1410 may be performed according to the methods described herein. In certain examples, aspects of the operations of 1410 may be performed by a node identification component as described with reference to FIGS. 6 through 9.

At 1415 the base station 105 or node may establish the wireless link with the second node based at least in part on the first SS and the second SS. The operations of 1415 may be performed according to the methods described herein. In certain examples, aspects of the operations of 1415 may be performed by a link establishment component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting, from a first relay node seeking to join a backhaul network, a first synchronization signal, wherein the first relay node is seeking to establish a wireless link between the first relay node and one or more relay nodes established in the backhaul network, wherein the first synchronization signal includes an indication that the first relay node is a relay node seeking to join the backhaul network, and wherein the first relay node transmits the first synchronization signal in response to failing to detect a synchronization signal from the second relay node or another relay node of the backhaul network in a pre-determined time period;
    receiving, at the first relay node, a response signal from a second relay node that is established in the backhaul network; and
    establishing the wireless link with the second relay node based at least in part on the response signal from the second relay node.

2. The method of claim 1, wherein the first synchronization signal is a millimeter wave signal, and wherein the wireless link with the second relay node is a millimeter wave wireless link.

3. The method of claim 1, wherein the receiving the response signal comprises receiving a second synchronization signal from the second relay node.

4. The method of claim 3, wherein the receiving the response signal further comprises identifying an access configuration of the second relay node based at least in part on information contained in the second synchronization signal.

5. The method of claim 3, wherein the establishing the wireless link with the second relay node comprises transmitting a random access request message to the second relay node based at least in part on the second synchronization signal from the second relay node.

6. The method of claim 1, wherein the receiving the response signal comprises receiving a random access request from the second relay node in response to the first synchronization signal that requests the first relay node join the backhaul network.

7. The method of claim 6, wherein the establishing the wireless link comprises transmitting a random access response to the second relay node, and establishing the wireless link based at least in part on the random access response.

8. The method of claim 1, wherein the receiving the response signal comprises receiving a second synchronization signal from the second relay node, the second synchronization signal transmitted using a beam directed toward the first relay node and including access configuration information of the second relay node.

9. The method of claim 8, wherein the access configuration information of the second relay node comprises one or more of a random access preamble for a random access request, a number of antenna ports for the random access request, random access resources for transmitting the random access request, power control information for transmitting the random access request, or any combination thereof.

10. The method of claim 1, wherein the receiving the response signal comprises receiving a second synchronization signal from the second relay node, the second synchronization signal including access configuration information of a third node.

11. The method of claim 1, wherein the indication that the first relay node is a relay node seeking to join the backhaul network comprises a temporary cell ID selected from of a preconfigured set of cell IDs for new relays, and wherein the first synchronization signal includes information for generating a random access request at the second relay node.

12. The method of claim 11, wherein the response signal is a random access request from the second relay node, and wherein the second relay node transmits one or more commands to align a time reference and frequency reference of the first relay node to corresponding references of the second relay node.

13. The method of claim 12, wherein the one or more commands are transmitted in a random access procedure, in radio resource control signaling, or combinations thereof.

14. The method of claim 1, wherein the receiving the response signal comprises receiving a random access request from the second relay node having a random access preamble, or using a random access resource, that indicates a request that the first relay node join the backhaul network, and wherein the receiving the response signal further comprises receiving two or more random access messages that include information for establishing the wireless link.

15. The method of claim 1, further comprising:
establishing, prior to the transmitting, an initial wireless link with the second relay node; and
determining that a loss of connection has occurred for the initial wireless link, and the transmitting and the receiving are performed responsive to the determining that the loss of connection has occurred.

16. An apparatus for wireless communication, comprising:
a processor;
memory in electronic communication with the processor; and
instructions stored in the memory and executable by the processor to cause the apparatus to:
transmit, from a first relay node seeking to join a backhaul network, a first synchronization signal, wherein the first relay node is seeking to establish a wireless link between the first relay node and one or more other nodes of the backhaul network, wherein the first synchronization signal includes an indication that the first relay node is a relay node seeking to join the backhaul network and wherein the first relay node transmits the first synchronization signal in response to failing to detect a synchronization signal from the second relay node or another relay node of the backhaul network in a pre-determined time period;
receive, at the first relay node, a response signal from a second relay node that is established in the backhaul network; and
establish the wireless link with the second relay node based at least in part on the response signal from the second relay node.

17. The apparatus of claim 16, further comprising a transceiver, wherein the transceiver includes a transmitter configured to transmit the first synchronization signal as a millimeter wave signal and wherein the transceiver is further configured to establish the wireless link with the second relay node as a millimeter wave wireless link.

18. The apparatus of claim 16, further comprising a transceiver, the transceiver including a receiver configured to receive a second synchronization signal from the second relay node.

19. The apparatus of claim 18, wherein the instructions are further configured to cause the apparatus to identify an access configuration of the second relay node based at least in part on information contained in the second synchronization signal.

20. The apparatus of claim 18, wherein the instructions to establish the wireless link with the second relay node comprise instructions to cause the apparatus to transmit a random access request message to the second relay node based at least in part on the second synchronization signal from the second relay node.

21. The apparatus of claim 16, wherein the instructions to receive the response signal comprise instructions to receive a random access request from the second relay node in response to the first synchronization signal that requests the first relay node join the backhaul network.

22. The apparatus of claim 16, wherein the instructions to establish the wireless link comprise instructions to transmit a random access response to the second relay node, and to establish the wireless link based at least in part on the random access response.

23. The apparatus of claim 16, further comprising a transceiver configured to receive a beam directed towards the first relay node including the second synchronization signal, wherein the second synchronization signal includes access configuration information of the second relay node.

24. The apparatus of claim 23, wherein the access configuration information of the second relay node comprises one or more of a random access preamble for a random access request, a number of antenna ports for the random access request, random access resources for transmitting the random access request, power control information for transmitting the random access request, or any combination thereof.

25. A first relay node comprising:
means for transmitting, from the first relay node seeking to join a backhaul network, a first synchronization signal, wherein the first relay node is seeking to establish a wireless link between the first relay node and one or more relay nodes established in the backhaul network, wherein the first synchronization signal includes an indication that the first relay node is a relay node seeking to join the backhaul network, and wherein the first relay node transmits the first synchronization signal in response to failing to detect a synchronization signal from the second relay node or another relay node of the backhaul network in a pre-determined time period;

means for receiving, at the first relay node, a response signal from a second relay node that is established in the backhaul network; and means for establishing the wireless link with the second relay node based at least in part on the response signal from the second relay node.

26. The first relay node of claim 25, wherein the means for transmitting the first synchronization signal comprises means for transmitting the first synchronization signal as a millimeter wave signal, and wherein the means for establishing the wireless link with the second relay node comprises means for establishing a millimeter wave wireless link.

* * * * *